(12) United States Patent
Zhang et al.

(10) Patent No.: US 12,165,056 B2
(45) Date of Patent: Dec. 10, 2024

(54) AUXILIARY MODEL FOR PREDICTING NEW MODEL PARAMETERS

(71) Applicant: Microsoft Technology Licensing, LLC, Redmond, WA (US)

(72) Inventors: Cheng Zhang, Cambridge (GB); Angus Lamb, Cambridge (GB); Evgeny Sergeevich Saveliev, Cambridge (GB); Yingzhen Li, Cambridge (GB); Camilla Longden, Cambridge (GB); Pashmina Cameron, Cambridge (GB); Sebastian Tschiatschek, Cambridge (GB); Jose Miguel Hernández Lobato, Cambridge (GB); Richard Turner, Cambridge (GB)

(73) Assignee: Microsoft Technology Licensing, LLC., Redmond, WA (US)

(*) Notice: Subject to any disclaimer, the term of this patent is extended or adjusted under 35 U.S.C. 154(b) by 1065 days.

(21) Appl. No.: 17/095,700

(22) Filed: Nov. 11, 2020

(65) Prior Publication Data
US 2022/0147818 A1    May 12, 2022

(30) Foreign Application Priority Data

Sep. 28, 2020 (GB) .................................. 2015297

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC ........ G06N 3/045; G06N 3/0454; G06N 3/08; G06N 3/084
See application file for complete search history.

(56) References Cited

U.S. PATENT DOCUMENTS

| | | | |
|---|---|---|---|
| 2008/0215513 A1* | 9/2008 | Weston ............... | G06F 18/2115 706/13 |
| 2020/0192985 A1* | 6/2020 | Na ......................... | G06F 40/55 |
| 2020/0372352 A1* | 11/2020 | Deng ..................... | G06N 3/045 |
| 2020/0372684 A1* | 11/2020 | Wen ....................... | G06T 9/00 |

OTHER PUBLICATIONS

Hinton, Geoffrey E. "Learning to represent visual input." Philosophical Transactions of the Royal Society B: Biological Sciences 365.1537 (2010): 177-184. (Year: 2010).*

Tran, Phi Vu. "Learning to make predictions on graphs with autoencoders." 2018 IEEE 5th international conference on data science and advanced analytics (DSAA). IEEE, 2018. (Year: 2018).*

Zeng, Guanxiong, et al. "Continual learning of context-dependent processing in neural networks." Nature Machine Intelligence 1.8 (2019): 364-372. (Year: 2019).*

(Continued)

*Primary Examiner* — Randall K. Baldwin
(74) *Attorney, Agent, or Firm* — Barta Jones, PLLC

(57) ABSTRACT

A computer-implemented method of training an auxiliary machine learning model to predict a set of new parameters of a primary machine learning model, wherein the primary model is configured to transform from an observed subset of a set of real-world features to a predicted version of the set of real-world features.

20 Claims, 17 Drawing Sheets

(56) References Cited

OTHER PUBLICATIONS

Lacaille, Philippe. "Analyzing the benefits of communication channels between deep learning models." arXiv preprint arXiv: 1904.09211 (2019): i-65 (Year: 2019).*

Fan, Jianqing, Cong Ma, and Yiqiao Zhong. "A Selective Overview of Deep Learning." arXiv preprint arXiv:1904.05526 (2019): 1-37 (Year: 2019).*

Gong, Wenbo, et al. "Icebreaker: Element-wise efficient information acquisition with a bayesian deep latent gaussian model." Advances in neural information processing systems 32 (2019): 1-12 (Year: 2019).*

Overweg, Hiske, et al. "Interpretable outcome prediction with sparse Bayesian neural networks in intensive care." arXiv preprint arXiv:1905.02599 (2019): 1-16 (Year: 2019).*

Cai, John, and Sheng Mei Shen. "Cross-domain few-shot learning with meta fine-tuning." arXiv preprint arXiv:2005.10544 (Aug. 2020). (Year: 2020).*

Simeone, Osvaldo. "A very brief introduction to machine learning with applications to communication systems." IEEE Transactions on Cognitive Communications and Networking 4.4 (2018): 648-664. (Year: 2018).*

Balabanovic, et al., "Fab: Content-Based, Collaborative Recommendation", In Journal of Communications of the ACM, vol. 40, Issue 3, Mar. 1997, pp. 66-72.

Bertinetto, et al., "Learning Feed-Forward One-Shot Learners", In Proceedings of Annual Conference on Neural Information Processing Systems, Dec. 5, 2016, 09 Pages.

Bharadhwaj, Homanga, "Meta-Learning for User Cold-Start Recommendation", In Proceedings of International Joint Conference on Neural Networks, Jul. 14, 2019, 08 Pages.

Finn, et al., "Model-Agnostic Meta-Learning for Fast Adaptation of Deep Networks", In Proceedings of the 34th International Conference on Machine Learning, vol. 70, Jul. 18, 2017, 10 Pages.

Gomez-Uribe, et al., "The Netflix Recommender System: Algorithms, Business Value, and Innovation", In Journal of ACM Transactions on Management Information Systems, Dec. 28, 2015, 19 Pages.

Gong, et al., "Icebreaker: Element-wise efficient information acquisition with a bayesian deep latent gaussian model", In Proceedings of Annual Conference on Neural Information Processing Systems, Dec. 8, 2019, 12 Pages.

Gordon, et al., "VERSA: Versatile and Efficient Few-shot Learning", In Proceedings of Third workshop on Bayesian Deep Learning, Dec. 7, 2018, 09 Pages.

Grefenstette, et al., "Generalized Inner Loop Meta-Learning", In Repository of arXiv:1910.01727, Oct. 3, 2019, 17 Pages.

Ha, et al., "HyperNetworks", In Repository of arXiv:1609.09106, Sep. 27, 2016, 23 Pages.

Harper, et al., "The MovieLens Datasets: History and Context", In Journal of ACM Transactions on Interactive Intelligent Systems, vol. 5, Issue 4, Article 19, Dec. 2015, 19 Pages.

He, et al., "Neural Collaborative Filtering", In Proceedings of the 26th International Conference on World Wide Web, Apr. 3, 2017, pp. 173-182.

Kingma, et al., "Adam: A Method for Stochastic Optimization", In Repository of arXiv:1412.6980, Dec. 22, 2014, 9 Pages.

Kirkpatrick, et al., "Overcoming Catastrophic Forgetting in Neural Networks", In Proceedings of the National Academy of Sciences, vol. 114, Issue 13, Mar. 28, 2017, pp. 3521-3526.

Lam, et al., "Addressing Cold-Start Problem in Recommendation Systems", In Proceedings of the 2nd International Conference on Ubiquitous Information Management and Communication, Jan. 31, 2008, pp. 208-211.

Liang, et al., "Variational Autoencoders for Collaborative Filtering", In Proceedings of the World Wide Web Conference, Apr. 23, 2018, pp. 689-698.

Lika, et al., "Facing the Cold Start Problem in Recommender Systems", In Journal of Expert Systems with Applications, vol. 41, Issue 4, Part 2, Mar. 2014, pp. 2065-2073.

Lops, et al., "Content-based Recommender Systems: State of the Art and Trends", In Recommender Systems Handbook, 2011, pp. 73-105.

Ma, et al., "Eddi: Efficient dynamic discovery of high-value information with partial VAE", In Repository of arXiv:1809.11142, Sep. 28, 2018, 22 Pages.

Ma, et al., "Partial VAE for Hybrid Recommender System", In Proceedings of 3rd NeurIPS workshop on Bayesian Deep Learning, Dec. 7, 2018, 7 Pages.

Munkhdalai, et al., "Rapid Adaptation with Conditionally Shifted Neurons", In Repository of arXiv:1712.09926v3, Jul. 3, 2018, 12 Pages.

Nguyen, et al., "Variational Continual Learning", In Repository of arXiv:1710.10628, Oct. 29, 2017, 17 Pages.

Nichol, et al., "Reptile: a Scalable Metalearning Algorithm", In Repository of arXiv:1803.02999, Mar. 8, 2018, 11 Pages.

Oswald, et al., "Continual Learning with Hypernetworks", In Repository of arXiv:1906.00695, Jun. 3, 2019, 16 Pages.

Paszke, et al., "Automatic Differentiation in PyTorch", In Proceedings of Thirty-first Conference on Neural Information Processing Systems, Dec. 4, 2017, 4 Pages.

Pazzani, et al., "Content-Based Recommendation Systems", In Book of The Adaptive Web, 2007, pp. 325-341.

Qi, et al., "PointNet: Deep Learning on Point Sets for 3D Classification and Segmentation", In Proceedings of the IEEE Conference on Computer Vision and Pattern Recognition, Jul. 22, 2017, pp. 652-660.

Requeima, et al., "Fast and Flexible Multi-Task Classification using Conditional Neural Adaptive Processes", In Proceedings of Annual Conference on Neural Information Processing Systems, Dec. 8, 2019, 12 Pages.

Sarwar, et al., "Item-Based Collaborative Filtering Recommendation Algorithms", In Proceedings of the 10th International Conference on World Wide Web, May 1, 2001, pp. 285-295.

Schafer, et al., "Collaborative Filtering Recommender Systems", In Book of The Adaptive Web, 2007, pp. 291-324.

Schein, et al., "Methods and Metrics for Cold-Start Recommendations", In Proceedings of the 25th Annual International ACM SIGIR Conference on Research and Development in Information Retrieval, Aug. 11, 2002, pp. 253-260.

Sedhain, et al., "AutoRec: Autoencoders Meet Collaborative Filtering", In Proceedings of the 24th International Conference on World Wide Web, May 18, 2015, pp. 111-112.

Snell, et al., "Prototypical Networks for Few-shot Learning", In Proceedings of Annual Conference on Neural Information Processing Systems, Dec. 4, 2017, 11 Pages.

Stern, et al., "Matchbox: Large Scale Online Bayesian Recommendations", In Proceedings of the 18th International Conference on World Wide Web, Apr. 20, 2009, pp. 111-120.

Tu, et al., "Neuropathic Pain Diagnosis Simulator for Causal Discovery Algorithm Evaluation", In Proceedings of Annual Conference on Neural Information Processing Systems, Dec. 8, 2019, 12 Pages.

Vartak, et al., "A Meta-Learning Perspective on Cold-Start Recommendations for Items", In Proceedings of Annual Conference on Neural Information Processing Systems, Dec. 4, 2017, 11 Pages.

Vinyals, et al., "Matching Networks for One Shot Learning", In Proceedings of Annual Conference on Neural Information Processing Systems, Dec. 5, 2016, 09 Pages.

Zaheer, et al., "Deep Sets", In Proceedings of 31st Conference on Neural Information Processing Systems, Dec. 4, 2017, 11 Pages.

Cai, et al., "Cross-Domain Few-Shot Learning with Meta Fine-Tuning", In repository of arXiv:2005.10544v3, Jun. 2, 2020, 4 Pages.

Ehret, et al., "Continual Learning in Recurrent Neural Networks with Hypernetworks", In Repository of arXiv:2006.12109v1, Jun. 22, 2020, 33 Pages.

Ke, et al., "Continual Learning with Knowledge Transfer for Sentiment Classification", In Proceedings of the European Conference on Machine Learning and Principles and Practice of Knowledge Discovery in Databases, Sep. 14, 2020, 16 Pages.

Lamb, et al., "Contextual HyperNetworks for Novel Feature Adaptation", In Proceedings of Ninth International Conference on Learning Representations, May 3, 2021, pp. 1-17.

(56) References Cited

OTHER PUBLICATIONS

"International Search Report and Written Opinion Issued in PCT Application No. PCT/US21/039732", Mailed Date: Oct. 29, 2021, 13 Pages.

Zeng, et al., "Continual Learning of Context-Dependent Processing in Neural Networks", In Journal of Nature Machine Intelligence, vol. 1, Issue 8, Aug. 2019, pp. 364-372.

\* cited by examiner

- - - - → Inference

———→ Decoder

AUXILIARY MODEL FOR PREDICTING NEW MODEL PARAMETERS

CROSS-REFERENCE TO RELATED APPLICATION

This non-provisional utility application claims priority to UK patent application number 2015297.1 entitled "AUXILIARY MODEL FOR PREDICTING NEW MODEL PARAMETERS" and filed on Sep. 28, 2020 which is incorporated herein its entirety by reference.

BACKGROUND

Neural networks are used in the field of machine learning and artificial intelligence (AI). A neural network comprises plurality of nodes which are interconnected by links, sometimes referred to as edges. The input edges of one or more nodes form the input of the network as a whole, and the output edges of one or more other nodes form the output of the network as a whole, whilst the output edges of various nodes within the network form the input edges to other nodes. Each node represents a function of its input edge(s) weighted by a respective weight, the result being output on its output edge(s). The weights can be gradually tuned based on a set of experience data (training data) so as to tend towards a state where the network will output a desired value for a given input.

Typically the nodes are arranged into layers with at least an input and an output layer. A "deep" neural network comprises one or more intermediate or "hidden" layers in between the input layer and the output layer. The neural network can take input data and propagate the input data through the layers of the network to generate output data. Certain nodes within the network perform operations on the data, and the result of those operations is passed to other nodes, and so on.

FIG. 1A gives a simplified representation of an example neural network 101 by way of illustration. The example neural network comprises multiple layers of nodes 104: an input layer 102$i$, one or more hidden layers 102$h$ and an output layer 102$o$. In practice, there may be many nodes in each layer, but for simplicity only a few are illustrated. Each node 104 is configured to generate an output by carrying out a function on the values input to that node. The inputs to one or more nodes form the input of the neural network, the outputs of some nodes form the inputs to other nodes, and the outputs of one or more nodes form the output of the network.

At some or all of the nodes of the network, the input to that node is weighted by a respective weight. A weight may define the connectivity between a node in a given layer and the nodes in the next layer of the neural network. A weight can take the form of a single scalar value or can be modelled as a probabilistic distribution. When the weights are defined by a distribution, as in a Bayesian model, the neural network can be fully probabilistic and captures the concept of uncertainty. The values of the connections 106 between nodes may also be modelled as distributions. This is illustrated schematically in FIG. 1B. The distributions may be represented in the form of a set of samples or a set of parameters parameterizing the distribution (e.g. the mean $\mu$ and standard deviation $\sigma$ or variance $\sigma^2$).

The network learns by operating on data input at the input layer, and adjusting the weights applied by some or all of the nodes based on the input data. There are different learning approaches, but in general there is a forward propagation through the network from left to right in FIG. 1A, a calculation of an overall error, and a backward propagation of the error through the network from right to left in FIG. 1A. In the next cycle, each node takes into account the back propagated error and produces a revised set of weights. In this way, the network can be trained to perform its desired operation.

The input to the network is typically a vector, each element of the vector representing a different corresponding feature. E.g. in the case of image recognition the elements of this feature vector may represent different pixel values, or in a medical application the different features may represent different symptoms or patient questionnaire responses. The output of the network may be a scalar or a vector. The output may represent a classification, e.g. an indication of whether a certain object such as an elephant is recognized in the image, or a diagnosis of the patient in the medical example.

FIG. 1C shows a simple arrangement in which a neural network is arranged to predict a classification based on an input feature vector. During a training phase, experience data comprising a large number of input data points X is supplied to the neural network, each data point comprising an example set of values for the feature vector, labelled with a respective corresponding value of the classification Y. The classification Y could be a single scalar value (e.g. representing elephant or not elephant), or a vector (e.g. a one-hot vector whose elements represent different possible classification results such as elephant, hippopotamus, rhinoceros, etc.). The possible classification values could be binary or could be soft-values representing a percentage probability. Over many example data points, the learning algorithm tunes the weights to reduce the overall error between the labelled classification and the classification predicted by the network. Once trained with a suitable number of data points, an unlabelled feature vector can then be input to the neural network, and the network can instead predict the value of the classification based on the input feature values and the tuned weights.

Training in this manner is sometimes referred to as a supervised approach. Other approaches are also possible, such as a reinforcement approach wherein the network each data point is not initially labelled. The learning algorithm begins by guessing the corresponding output for each point, and is then told whether it was correct, gradually tuning the weights with each such piece of feedback. Another example is an unsupervised approach where input data points are not labelled at all and the learning algorithm is instead left to infer its own structure in the experience data. The term "training" herein does not necessarily limit to a supervised, reinforcement or unsupervised approach.

A machine learning model (also known as a "knowledge model") can also be formed from more than one constituent neural network. An example of this is an auto encoder, as illustrated by way of example in FIGS. 4A-D. In an auto encoder, an encoder network is arranged to encode an observed input vector $X_o$ into a latent vector Z, and a decoder network is arranged to decode the latent vector back into the real-world feature space of the input vector. The difference between the actual input vector $X_o$ and the version of the input vector $\hat{X}$ predicted by the decoder is used to tune the weights of the encoder and decoder so as to minimize a measure of overall difference, e.g. based on an evidence lower bound (ELBO) function. The latent vector Z can be thought of as a compressed form of the information in the input feature space. In a variational auto encoder (VAE), each element of the latent vector Z is modelled as a probabilistic or statistical distribution such as a Gaussian. In this case, for each element of Z the encoder learns one or more parameters of the distribution, e.g. a measure of centre point and spread of the distribution. For instance the centre point could be the mean and the spread could be the variance or standard deviation. The value of the element input to the decoder is then randomly sampled from the learned distribution.

The encoder is sometimes referred to as an inference network in that it infers the latent vector Z from an input observation $X_o$. The decoder is sometimes referred to as a generative network in that it generates a version $\hat{X}$ of the input feature space from the latent vector Z.

Once trained, the auto encoder can be used to impute missing values from a subsequently observed feature vector $X_o$. Alternatively or additionally, a third network can be trained to predict a classification Y from the latent vector, and then once trained, used to predict the classification of a subsequent, unlabelled observation.

SUMMARY

In many deep learning application domains, it is common to see the set of output features from a model grow over time: a new item may be introduced into a recommender system, a new question may be added to a survey, a new disease may require diagnosis, a new sensor may become available to a system, etc. In such settings, it is valuable to be able to accurately predict the values that this feature takes within data points for which it is unobserved: for example, predicting whether a user will like a new movie in a recommender system, predicting how a user will answer a new question in a questionnaire, predicting how a patient may react to a new medical test, etc.

On the introduction of a new feature, there may be few or even no labelled data points containing observed values for it. For instance, a newly added movie may have received very few or even no ratings, or a vehicle may be fitted with a new sensor for the first time. The typically poor performance of machine learning models in this low-data regime is often referred to as the cold-start problem, which is prevalent not only in recommender systems but also in applications where high quality data is sparse. This presents a key challenge: the adaptation of a deep learning model to accurately predict the new feature values in the low data regime. On one hand, it is often required to deploy the model in applications immediately upon the arrival of new features, so it is impractical for the adaptation to wait until much more data has been acquired. On the other hand, simply retraining the model every time a new feature is introduced is computationally costly, and may fall victim to severe over-fitting if there is only a small number of observations available for the new feature.

Therefore a problem exists of how to augment an existing deep learning model with new features, whilst at the same time being computationally efficient (e.g. requiring no additional training, or finetuning of the existing model). Moreover, the solution to the problem should reduce over-fitting in the low data regime while effectively making use of all available information for the new features, and crucially capturing how new features relate to existing features in the model. To address these challenges simultaneously, the inventors of the present application have developed an auxiliary model which can predict new parameters for use by an existing model in predicting values of the new features. The auxiliary model is referred to herein as a "contextual hypernetwork" (CHN).

According to one aspect disclosed herein, there is provided a computer-implemented method of training an auxiliary machine learning model to predict a set of new parameters of a primary machine learning model, wherein the primary model is configured to transform from an observed subset of a set of real-world features to a predicted version of the set of real-world features, and wherein the auxiliary model comprises: a first neural network configured to transform from a set of first input vectors to a single context vector, wherein each input vector is associated with a respective data point of the primary model and comprises a respective representation vector comprising an internal representation of the observed subset of real-world features of that data point and a respective value of the new feature for that respective data point, and wherein the context vector is a representation of values of the new feature in context of the primary model; and a second neural network configured to predict a set of new parameters of the primary model based on at least the context vector, wherein the primary model is configured to use the set of new parameters to transform from at least the observed version of the set of real-world features to a predicted version of the new real-world feature.

The primary model is an existing machine learning model, e.g. an existing neural network. The primary model is used to predict values of an existing set of features. That is, the primary model is configured to transform from a set of observed features (i.e. known values of those features) to a predicted set of features. The predicted set of features comprises at least the observed features, and may also comprise one or more unobserved features (i.e. features for which no known values are available prior to prediction). The primary model comprises a plurality of model parameters, i.e. model weights.

The auxiliary model is used to predict a set of new model parameters for use in predicting values of a new feature. The new feature is a feature which does not form part of the existing set of features. For instance, the set of existing features may relate to existing sensors configured to measure characteristics of a machine (e.g. a drilling device). The new feature may relate to a new sensor fitted to the machine. Rather than re-training the primary model to predict (i.e. calculate) the new parameters, the inventors of the present application have realised that the auxiliary model can be used to predict the new parameters, which can then be provided to the primary model.

The auxiliary model, i.e. an auxiliary neural network, is a contextual hypernetwork (CHN), that can be used to initialize the existing model's parameters (i.e. network weights) associated with a new feature. The CHN is conditioned on a context set made up of observations for the new feature, if any are available. The CHN may also be conditioned on any associated content information or metadata, again if available. CHNs amortize the process of performing gradient descent (or other training techniques) on the new parameters by mapping the newly observed data directly into high-performing new parameter values, with no additional fine-tuning of the model being required. This makes CHNs highly computationally efficient and scalable to large datasets.

Each data point (e.g. a particular user) of the primary model is associated with a respective representation vector. The representation vector comprises an internal representation of the observed features of the primary model for the respective data point. The auxiliary model is provided with, for each data point, the respective representation vector and a value of the new feature for that data point, if such a value is available. Note that typically at least some, if not all, values of the new feature may not be available. The representation vector and value of the new feature are input to the model via respective input vectors. The auxiliary model then transforms from a set of one or more input vectors to a context vector. The context vector is a representation of values of the new feature in the context of the primary model. In other words, the context vector is a representation of values of the new feature in the context of the model's belief about the data points in which those new values reside.

The auxiliary model then transforms from the context vector to a set of new parameters for use by the primary model. In other words, the context vector is passed through a neural network (along with a metadata vector in some examples) to generate the new parameters. The new parameters may then be supplied to the primary model.

The CHN may be used to augment a range of different types of deep learning models. For instance, a CHN may be used to augment a partial variational autoencoder (P-VAE). The result is a flexible deep learning model able to rapidly adapt to new features, even when the data is sparsely-observed, e.g. in recommender systems. As shown below, such a model outperforms a range of baselines in both predictive accuracy and speed when used for prediction in recommender system, e-learning and healthcare settings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which:

FIGS. 4A to 4D are schematic illustrations of examples of variational auto encoders (VAEs)

DETAILED DESCRIPTION OF EMBODIMENTS

The novel auxiliary model of the present application will be discussed in detail with reference to FIG. 7 onwards. First however a general overview of neural networks is provided. Variational autoencoders are then discussed with reference to FIGS. 4A to 4D as an example of a primary model that may be used in conjunction with the auxiliary model of the present invention. Then follows a discussion of partial-VAEs with reference to FIGS. 5A to 6 which may also be used in conjunction with the auxiliary model. Note however that VAEs and partial-VAEs are provided merely as illustrative examples and more generally the auxiliary model may be used in conjunction with different types of machine learning models.

Figure 2:
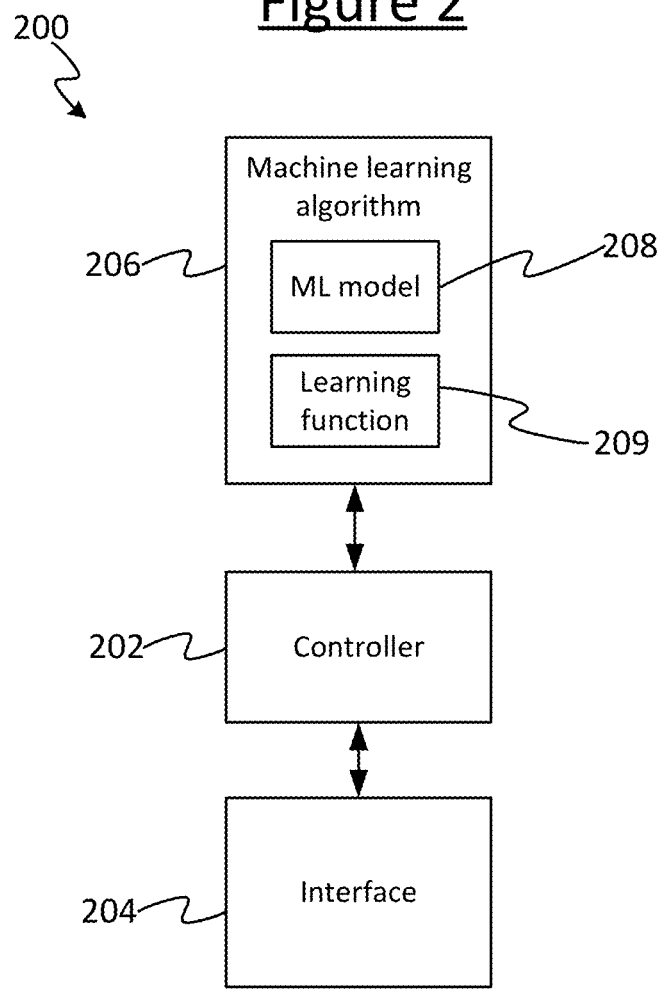
FIG. 2 is a schematic illustration of a computing apparatus for implementing a neural network, FIG. 3 schematically illustrates a data set comprising a plurality of data points each comprising one or more feature values.

FIG. 2 illustrates an example computing apparatus 200 for implementing an artificial intelligence (AI) algorithm including a machine-learning (ML) model in accordance with embodiments described herein. The computing apparatus 200 may comprise one or more user terminals, such as a desktop computer, laptop computer, tablet, smartphone, wearable smart device such as a smart watch, or an on-board computer of a vehicle such as car, etc. Additionally or alternatively, the computing apparatus 200 may comprise a server. A server herein refers to a logical entity which may comprise one or more physical server units located at one or more geographic sites. Where required, distributed or "cloud" computing techniques are in themselves known in the art. The one or more user terminals and/or the one or more server units of the server may be connected to one another via a packet-switched network, which may comprise for example a wide-area internetwork such as the Internet, a mobile cellular network such as a 3GPP network, a wired local area network (LAN) such as an Ethernet network, or a wireless LAN such as a Wi-Fi, Thread or 6LoWPAN network.

The computing apparatus 200 comprises a controller 202, an interface 204, and an artificial intelligence (AI) algorithm 206. The controller 202 is operatively coupled to each of the interface 204 and the AI algorithm 206.

Each of the controller 202, interface 204 and AI algorithm 206 may be implemented in the form of software code embodied on computer readable storage and run on processing apparatus comprising one or more processors such as CPUs, work accelerator co-processors such as GPUs, and/or other application specific processors, implemented on one or more computer terminals or units at one or more geographic sites. The storage on which the code is stored may comprise one or more memory devices employing one or more memory media (e.g. electronic or magnetic media), again implemented on one or more computer terminals or units at one or more geographic sites. In embodiments, one, some or all the controller 202, interface 204 and AI algorithm 206 may be implemented on the server. Alternatively, a respective instance of one, some or all of these components may be implemented in part or even wholly on each of one, some or all of the one or more user terminals. In further examples, the functionality of the above-mentioned components may be split between any combination of the user terminals and the server. Again it is noted that, where required, distributed computing techniques are in themselves known in the art. It is also not excluded that one or more of these components may be implemented in dedicated hardware.

The controller 202 comprises a control function for coordinating the functionality of the interface 204 and the AI algorithm 206. The interface 204 refers to the functionality for receiving and/or outputting data. The interface 204 may comprise a user interface (UI) for receiving and/or outputting data to and/or from one or more users, respectively; or it may comprise an interface to one or more other, external devices which may provide an interface to one or more users. Alternatively the interface may be arranged to collect data from and/or output data to an automated function or equipment implemented on the same apparatus and/or one or more external devices, e.g. from sensor devices such as industrial sensor devices or IoT devices. In the case of interfacing to an external device, the interface 204 may comprise a wired or wireless interface for communicating, via a wired or wireless connection respectively, with the external device. The interface 204 may comprise one or more constituent types of interface, such as voice interface, and/or a graphical user interface.

The interface 204 is thus arranged to gather observations (i.e. observed values) of various features of an input feature space. It may for example be arranged to collect inputs entered by one or more users via a UI front end, e.g. microphone, touch screen, etc.; or to automatically collect data from unmanned devices such as sensor devices. The logic of the interface may be implemented on a server, and arranged to collect data from one or more external user devices such as user devices or sensor devices. Alternatively some or all of the logic of the interface 204 may also be implemented on the user device(s) or sensor devices its/themselves.

The controller 202 is configured to control the AI algorithm 206 to perform operations in accordance with the embodiments described herein. It will be understood that any of the operations disclosed herein may be performed by the AI algorithm 206, under control of the controller 202 to collect experience data from the user and/or an automated process via the interface 204, pass it to the AI algorithm 206, receive predictions back from the AI algorithm and output the predictions to the user and/or automated process through the interface 204.

The machine learning (ML) algorithm 206 comprises a machine-learning model 208, comprising one or more constituent neural networks 101. A machine-leaning model 208 such as this may also be referred to as a knowledge model. The machine learning algorithm 206 also comprises a learning function 209 arranged to tune the weights w of the nodes 104 of the neural network(s) 101 of the machine-learning model 208 according to a learning process, e.g. training based on a set of training data.

Figure 1A:
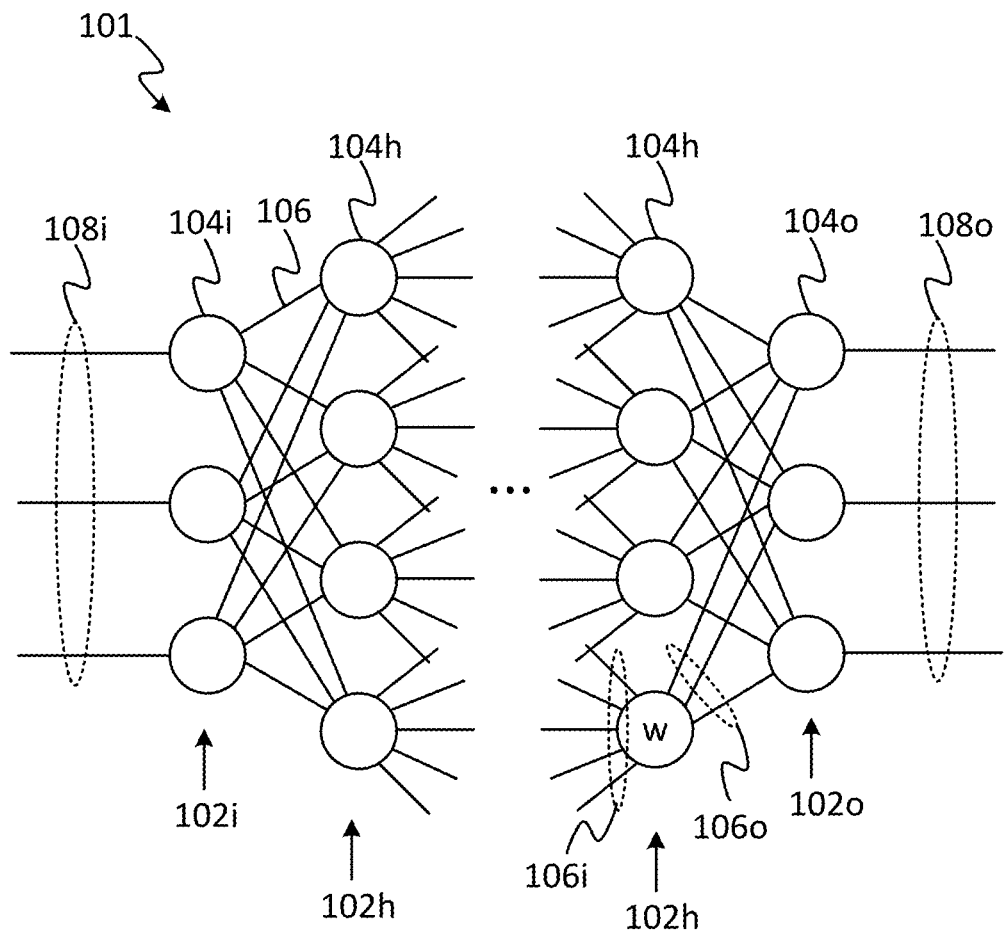
FIG. 1A is a schematic illustration of a neural network.

FIG. 1A illustrates the principle behind a neural network. A neural network 101 comprises a graph of interconnected nodes 104 and edges 106 connecting between nodes, all implemented in software. Each node 104 has one or more input edges and one or more output edges, with at least some of the nodes 104 having multiple input edges per node, and at least some of the nodes 104 having multiple output edges per node. The input edges of one or more of the nodes 104 form the overall input 108i to the graph (typically an input vector, i.e. there are multiple input edges). The output edges of one or more of the nodes 104 form the overall output 108o of the graph (which may be an output vector in the case where there are multiple output edges). Further, the output edges of at least some of the nodes 104 form the input edges of at least some others of the nodes 104.

Each node 104 represents a function of the input value(s) received on its input edges(s) 106i, the outputs of the function being output on the output edge(s) 106o of the respective node 104, such that the value(s) output on the output edge(s) 106o of the node 104 depend on the respective input value(s) according to the respective function. The function of each node 104 is also parametrized by one or more respective parameters w, sometimes also referred to as weights (not necessarily weights in the sense of multiplicative weights, though that is certainly one possibility). Thus the relation between the values of the input(s) 106i and the output(s) 106o of each node 104 depends on the respective function of the node and its respective weight(s).

Figure 1B:
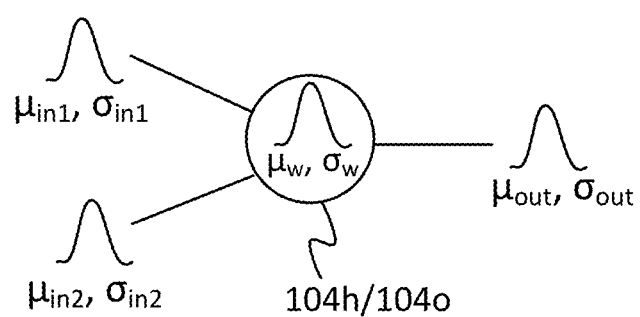
FIG. 1B is a schematic illustration of a node of a Bayesian neural network.

Each weight could simply be a scalar value. Alternatively, as shown in FIG. 1B, at some or all of the nodes 104 in the network 101, the respective weight may be modelled as a probabilistic distribution such as a Gaussian. In such cases the neural network 101 is sometimes referred to as a Bayesian neural network. Optionally, the value input/output on each of some or all of the edges 106 may each also be modelled as a respective probabilistic distribution. For any given weight or edge, the distribution may be modelled in terms of a set of samples of the distribution, or a set of parameters parameterizing the respective distribution, e.g. a pair of parameters specifying its centre point and width (e.g. in terms of its mean $\mu$ and standard deviation $\sigma$ or variance $\sigma^2$). The value of the edge or weight may be a random sample from the distribution. The learning or the weights may comprise tuning one or more of the parameters of each distribution.

As shown in FIG. 1A, the nodes 104 of the neural network 101 may be arranged into a plurality of layers, each layer comprising one or more nodes 104. In a so-called "deep" neural network, the neural network 101 comprises an input layer 102i comprising one or more input nodes 104i, one or more hidden layers 102h (also referred to as inner layers) each comprising one or more hidden nodes 104h (or inner nodes), and an output layer 102o comprising one or more output nodes 104o. For simplicity, only two hidden layers 102h are shown in FIG. 1A, but many more may be present.

The different weights of the various nodes 104 in the neural network 101 can be gradually tuned based on a set of experience data (training data), so as to tend towards a state where the output 108o of the network will produce a desired value for a given input 108i. For instance, before being used in an actual application, the neural network 101 may first be trained for that application. Training comprises inputting experience data in the form of training data to the inputs 108i of the graph and then tuning the weights w of the nodes 104 based on feedback from the output(s) 108o of the graph. The training data comprises multiple different input data points, each comprising a value or vector of values corresponding to the input edge or edges 108i of the graph 101.

Figure 1C:
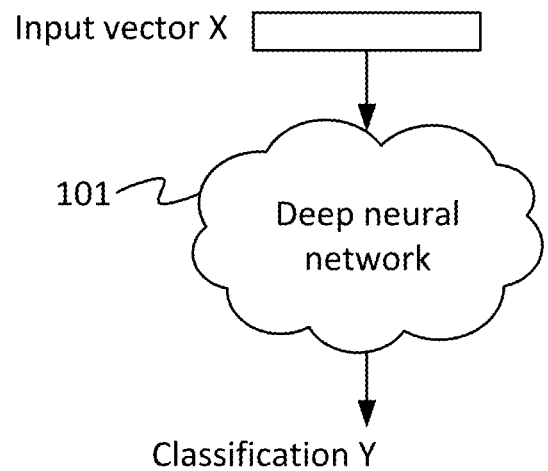
FIG. 1C is a schematic illustration of a neural network arranged to predict a classification based on an input feature vector.

For instance, consider a simple example as in FIG. 1C where the machine-learning model comprises a single neural network 101, arranged to take a feature vector X as its input 108i and to output a classification Y as its output 108o. The input feature vector X comprises a plurality of elements $x_d$, each representing a different feature d=0, 1, 2, . . . etc. E.g. in the example of image recognition, each element of the feature vector X may represent a respective pixel value. For instance one element represents the red channel for pixel (0,0); another element represents the green channel for pixel (0,0); another element represents the blue channel of pixel (0,0); another element represents the red channel of pixel (0,1); and so forth. As another example, where the neural network is used to make a medical diagnosis, each of the elements of the feature vector may represent a value of a different symptom of the subject, physical feature of the subject, or other fact about the subject (e.g. body temperature, blood pressure, etc.).

Figure 3:
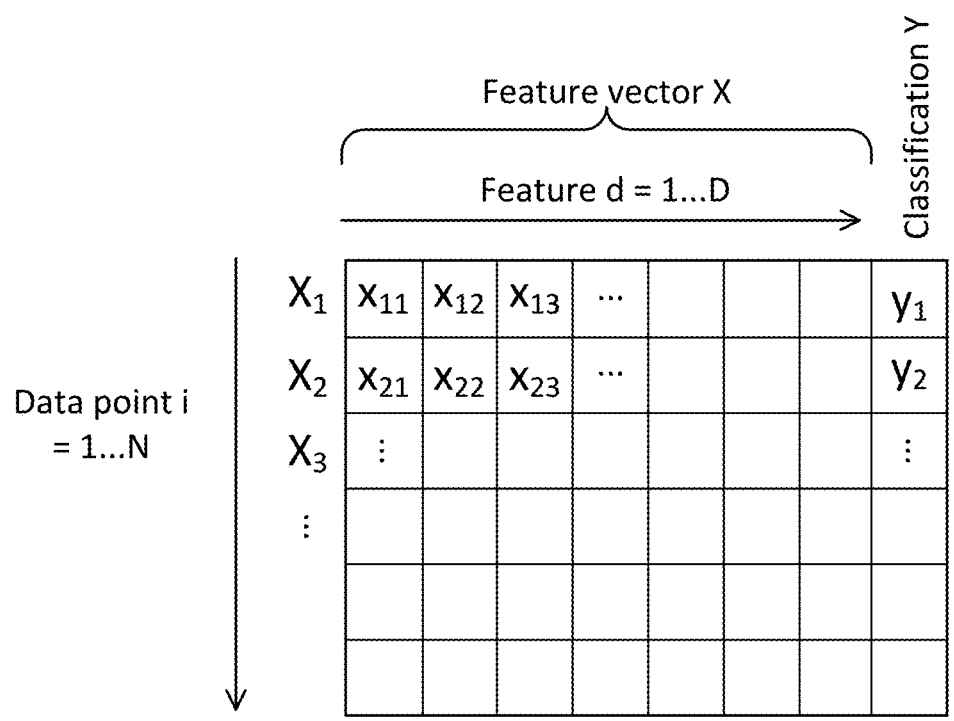

FIG. 3 shows an example data set comprising a plurality of data points i=0, 1, 2, . . . etc. Each data point i comprises a respective set of values of the feature vector (where xid is the value of the dth feature in the ith data point). The input feature vector Xi represents the input observations for a given data point, where in general any given observation i may or may not comprise a complete set of values for all the elements of the feature vector X. The classification Yi represents a corresponding classification of the observation i. In the training data an observed value of classification Yi is specified with each data point along with the observed values of the feature vector elements (the input data points in the training data are said to be "labelled" with the classification Yi). In subsequent a prediction phase, the classification Y is predicted by the neural network 101 for a further input observation X.

The classification Y could be a scalar or a vector. For instance in the simple example of the elephant-recognizer, Y could be a single binary value representing either elephant or not elephant, or a soft value representing a probability or confidence that the image comprises an image of an elephant. Or similarly, if the neural network 101 is being used to test for a particular medical condition, Y could be a single binary value representing whether the subject has the condition or not, or a soft value representing a probability or confidence that the subject has the condition in question. As another example, Y could comprise a "1-hot" vector, where each element represents a different animal or condition. E.g. Y=[1, 0, 0, . . . ] represents an elephant, Y=[0, 1, 0, . . . ] represents a hippopotamus, Y=[0, 0, 1, . . . ] represents a rhinoceros, etc. Or if soft values are used, Y=[0.81, 0.12, 0.05, . . . ] represents an 81% confidence that the image comprises an image of an elephant, 12% confidence that it comprises an image of a hippopotamus, 5% confidence of a rhinoceros, etc.

In the training phase, the true value of Yi for each data point i is known. With each training data point i, the AI algorithm 206 measures the resulting output value(s) at the output edge or edges 108o of the graph, and uses this feedback to gradually tune the different weights w of the various nodes 104 so that, over many observed data points, the weights tend towards values which make the output(s) 108i (Y) of the graph 101 as close as possible to the actual observed value(s) in the experience data across the training inputs (for some measure of overall error). I.e. with each piece of input training data, the predetermined training output is compared with the actual observed output of the graph 108o. This comparison provides the feedback which, over many pieces of training data, is used to gradually tune the weights of the various nodes 104 in the graph toward a state whereby the actual output 108o of the graph will closely match the desired or expected output for a given input 108i. Examples of such feedback techniques include for instance stochastic back-propagation.

Once trained, the neural network 101 can then be used to infer a value of the output 108o (Y) for a given value of the input vector 108i (X), or vice versa.

Explicit training based on labelled training data is sometimes referred to as a supervised approach. Other approaches to machine learning are also possible. For instance another example is the reinforcement approach. In this case, the neural network 101 begins making predictions of the classification Yi for each data point i, at first with little or no accuracy. After making the prediction for each data point i (or at least some of them), the AI algorithm 206 receives feedback (e.g. from a human) as to whether the prediction was correct, and uses this to tune the weights so as to perform better next time. Another example is referred to as the unsupervised approach. In this case the AI algorithm receives no labelling or feedback and instead is left to infer its own structure in the experienced input data.

FIG. 1C is a simple example of the use of a neural network 101. In some cases, the machine-learning model 208 may comprise a structure of two or more constituent neural networks 101.

Auxiliary Model

Figure 7:
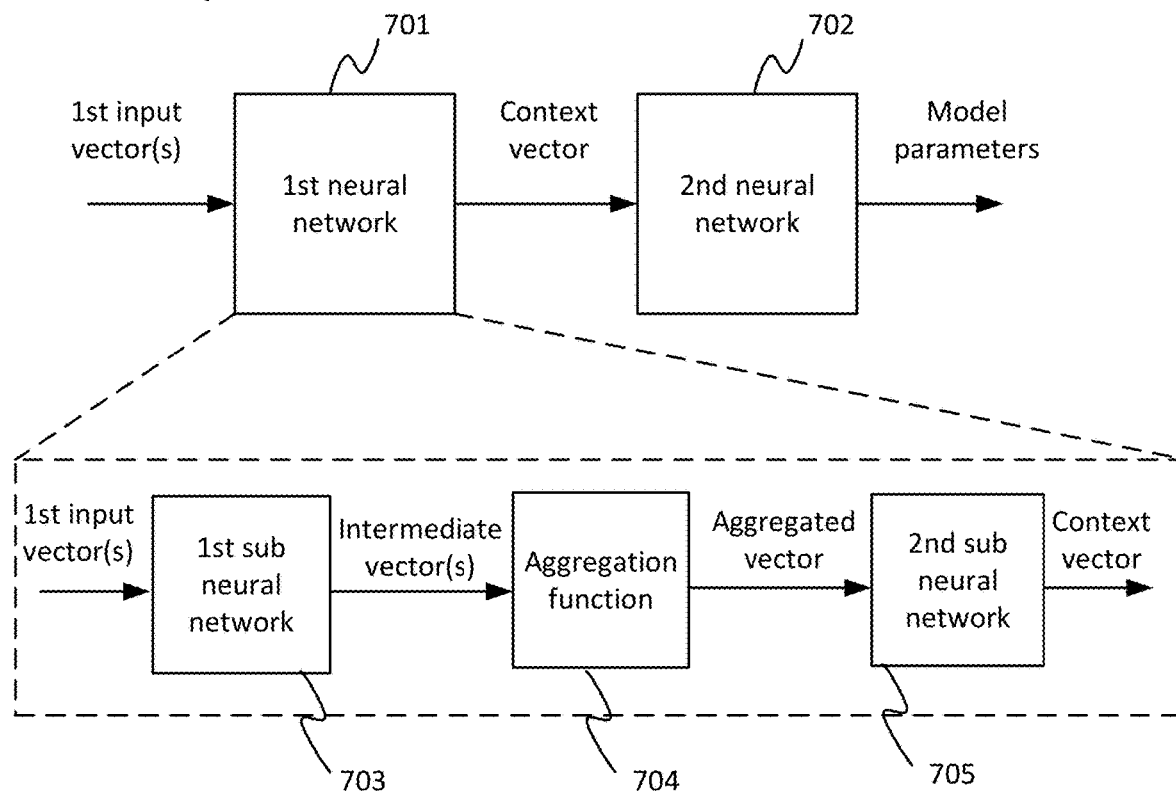
FIGS. 7 and 8 are schematic illustrations example auxiliary models, FIG. 9 schematically illustrates the interaction of an auxiliary model with a primary model, FIG. 10 schematically illustrates an example auxiliary model in further detail, FIG. 11 schematically illustrates an example auxiliary model applied to an example primary model, FIG. 12 schematically illustrates the data used when meta-training on a new feature, and FIG. 13 schematically illustrates an example auxiliary model applied to a partial variational autoencoder.
Figure 8:
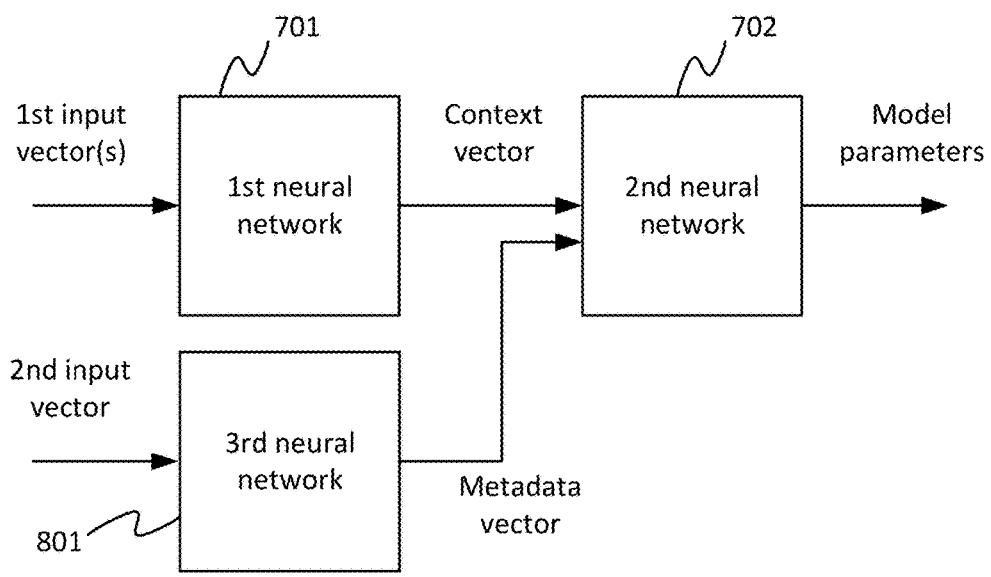

FIG. 7 illustrates an example auxiliary model 700. In general the auxiliary model 700 comprises a first neural network 701 and a second neural network 702. The auxiliary model 700 may also comprise a third neural network 801 as shown in FIG. 8. Note that one or more of the neural networks may themselves comprise more than one neural network and/or other functions. For instance, in some examples the first neural network may comprise two sub-networks.

The first neural network 701 is configured to receive, as an input, a set of input vectors. These inputs are referred to herein as "first input vectors" The set of first input vectors may comprise one input vector or a plurality of input vectors. Each input vector corresponds to a data point of the primary model. A data point may in turn correspond to, for example, a particular user, device, machine, etc. In general the primary model is used to make predictions about for said data points. Each first input vector comprises a representation vector. A representation vector encodes an internal representation of an observed set of features associated with a respective data point. Each representation vector may have the same fixed-length. In general the representation vectors may encode a representation of the observed features from any layer of the primary model.

Each first input vector also comprises a respective value of a new feature for the respective data point. For instance, the new feature may be a new test that is available (e.g. in a diagnostic setting), a new device for obtaining sensor information, a new question of a questionnaire, a new movie, etc. In some examples the respective value may be an observed value. In other examples there may be no observed value for a given data point and therefore the value represents this lack of observation, e.g. a value of zero may be used to represent missing data. Of course, there may be case where zero is a legitimate value, in which case some other value may be used to represent missing data. As another example, missing data may be represented by a dummy value and a separate binary mask may be used to indicate to the model which values are observed and which are unobserved. Each first input vector may be a concatenation of the respective representation vector and the value of the new feature. Or, the representation vector and the value of the new feature may be otherwise combined.

The first neural network 701 is configured to transform from the set of first input vectors to a single context vector. The context vector encodes a representation of the values of the new features in the context of the primary model. The context vector may be a fixed-length vector. The first neural network 701 is connected to the second neural network 702 and thus is configured to pass the context vector to the second neural network 702.

The second neural network 702 is configured to receive, as an input, the context vector. The second neural network 702 is configured to transform from the context vector to a predicted set of new parameters for predicting values of the new feature. The new parameters may in general be parameters for use in any of the layers of the primary model, e.g. the first layer, final layer, or penultimate layer of the primary model. The second neural network 702 may be a feed forward network.

The auxiliary model 700 is trained such that the predicted new parameters generate accurate values of the new features. A discussion of said training is provided below. For now, suffice is to say that the primary model is trained first, the representation vectors are then extracted from the trained primary model and supplied to the auxiliary model 700, and then the auxiliary model 700 is trained to predict the new parameters. The new parameters are then supplied to the primary model. The existing parameters of the primary model remain unchanged.

Returning to FIG. 7, the first neural network 701 may comprise at least two sub neural networks, i.e. individual networks configured to perform a particular task. The first neural network 701 may also comprise an aggregation function 704. As shown, a first sub neural network 703 is configured to receive, as an input, the first input vectors. The first sub neural network 703 is configured to transform from each first input vector to a respective intermediate vector. That is, each first input vector is passed through the same first sub neural network 703 to generate a respective intermediate vector. In that sense the first sub neural network 703 is a shared network.

The aggregation function 704 is configured to aggregate the intermediate vectors to generate a fixed-length aggregated vector. The aggregation function 704 may in general apply any form of aggregation. The aggregation function 704 may perform a permutation-invariant operation, e.g. summation. Other functions may be used such as averaging or taking the maximum of the values at corresponding positions in the intermediate vectors. The aggregation function 704 is configured to pass the aggregated vector to the second sub neural network.

The second sub neural network 705 is configured to receive, as an input, the aggregated vector. The second sub neural network 705 is configured to transform (i.e. encode) from the aggregated vector to the context vector. The second sub neural network 705 is configured to pass the context vector to the second neural network 705.

As shown in FIG. 8, the auxiliary model 700 may comprise a third neural network 801. The third neural network 801 may be configured to receive, as an input, a second input vector. The second input vector 801 comprises a set of metadata values associated with the new feature. For instance, the metadata values may comprise a category of the new feature (e.g. type of medical test, movie category, etc.), image or text data associated with the new feature, etc. The second neural network 801 is configured to transform (i.e. encode) from the second input data to a metadata vector that is a representation of the metadata values. The third neural network 801 is configured to supply the metadata vector to the second neural network.

In this embodiment, the second neural network 702 is configured to predict the new parameters based on both the context vector and the metadata vector. For instance, the context vector and the metadata vector may be concatenated or otherwise combined, the result of which is then passed through the second neural network to generate the predicted new parameters.

Figure 9:
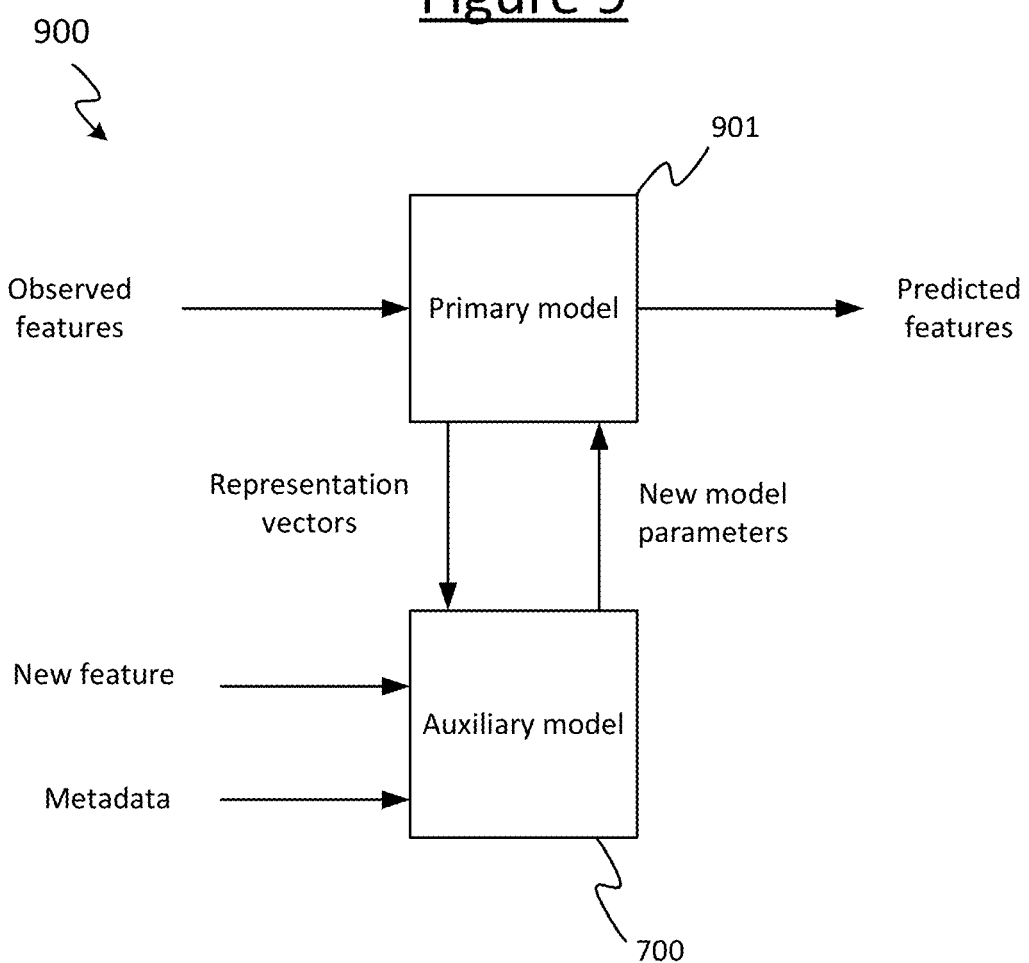

FIG. 9 schematically illustrates the interaction between the primary model 901 and the auxiliary model 700 in an environment 900. As shown, the primary model 901 is configured to generate predicted values of a set of features based on observed values of some of those features. The primary model 901 is configured to supply a set of representation vectors to the auxiliary model 700. Note that in some examples the auxiliary model 700 may obtain the representation vectors indirectly from the primary model 901. That is, the representation vectors may be extracted from the primary model 901 by a different function (an "extraction function") which then inputs the representation vectors to the auxiliary model 700. It is not excluded that the representation vectors are not manually input to the auxiliary model 700. The auxiliary model 700 receives values of the new feature if they are available, e.g. as a manual input and/or as inputs from sensors. The auxiliary model 700 also receives metadata values if they are available, e.g. as a manual input and/or as inputs from sensors. The auxiliary model 700 then generates the predicted set of model parameters as discussed above. The new model parameters are then supplied to the primary model 901. The new model parameters may be supplied to the primary model 901 directly from the auxiliary model 700. The primary model 901 then uses the new model parameters to predict values of the new features. In other words, the primary model 901 is extended using the new model parameters. The existing parameters of the primary model 901 are not changed. That is they remain fixed during training of the auxiliary model 700.

In general the primary model 901 may be used to in any setting where predictions based on observed data are beneficial. For instance, the primary model 901 may be used in a medical setting in order to predict or diagnose conditions of a living being (e.g. a human being or other animal). The features input to the primary model 901 may relate to medical data supplied to the primary model 901 by or on behalf of a patient, e.g. age, height, weight, blood pressure, heart rate, etc. The medical data may be supplied automatically via sensors, e.g. a heart rate monitor. The primary model 901 may use the observed features to predict a condition of the patient. The new feature may relate to newly available medical data, e.g. a new medical test may become available. The metadata may be descriptive of the test.

In other examples, the primary model 901 may be used in mechanical setting. For instance, the features may relate to characteristics of a machine. The primary model 901 may be used to improve performance of the machine, e.g. by predicting which settings of the machine to alter. Or, the primary model 901 may be used to improve a condition of the machine, e.g. to predict which actions to take to improve the lifespan of the machine. In some examples, the primary model 901 may be used to take preventive measures to preserve a condition of the machine. The new feature may relate to a new characteristic of the machine that can be monitored, or a new capability of the machine for which data is now available.

In some examples, the primary model 901 may be used to control an apparatus or vehicle. For instance, the features may relate to sensor data of a vehicle such as an autonomous (i.e. driverless) car. The sensor data may provide values of, e.g. speed, direction, acceleration, braking force, etc. the primary model 901 may be used to predict potential collisions and thus take action to prevent such collisions.

An illustrative model according to embodiments of the present invention will now be described. Experimental data is also provided.

Model

Problem Setting

Our goal is to enable fast adaptation of a machine learning model when new features are added to augment the originally observed data. Specifically, we consider the original observations as a set of vector-valued data points $D=\{x^{(i)}\}_{i=1}^{m}$, where each of the feature values in a given data point may be missing. We denote $x_j$ as the jth feature of a data point $x \in \mathcal{D}$ and group the observed and unobserved features within a data point as $x=[x_O, x_U]$. A machine learning model $p(x_U|x_O)$ aims then at predicting the unobserved features $x_U$ given observed ones $x_O$. This setting covers a wide range of applications. For example, in regression and classification the prediction target y is unobserved for test data, i.e. $y \in x_U$, while in recommender systems the data is sparsely observed and the set of observed features $x_O$ may vary between data points, and hence the set of prediction targets $x_U$ may also vary.

We consider a set of vector-valued, potentially sparsely-observed data points $\{x^{(i)}\}$ (so that some features are unobserved), where each distinct data point is denoted by a superscript $x^{(i)}$, and each feature within a data vector is denoted by a subscript $x_j$. Rather than considering a fixed partition of input and output features(x, y), we instead consider the partitioning of each data point into observed and unobserved features($x_O$, $x_U$).

Now suppose a new feature $x_n$ becomes available, so that each data vector $x \in \mathcal{D}$ is augmented to become $\tilde{x}=[x; x_n]$. This happens when e.g. a new item is added to a recommender system, or a new type of diagnostic test is added in a medical application. We note that not every data point $x \in \mathcal{D}$ receives an observed value for the new feature: a newly added movie may have received very few ratings, or a new diagnostic test may have yet to be performed on all of the patients. We refer to the set of data points where the new feature is observed as the context set for the new feature n, i.e.

$$\mathcal{C}_n = \{\tilde{x}=[x;x_n] | x \in \mathcal{D}, x_n \text{ is observed}\}$$

And its complement, the target set $\mathcal{T}_n$, is the set of those data points for which there is no associated observation for the feature, $$\mathcal{T}_n = \{\tilde{x}=[x;x_n] | x \in \mathcal{D}, x_n \text{ is unobserved}\}$$

One can also split the augmented data into observed and unobserved parts, i.e. $\tilde{x}=[\widetilde{x_O}, \widetilde{x_U}]$. Using this notation, it is clear that $\widetilde{x_O}=[x_O; x_n]$, $\widetilde{x_U}=x_U$ for $\tilde{x} \in \mathcal{C}_n$, and $\widetilde{x_O}=x_O$, $\widetilde{x_U}=[x_U; x_n]$ for $\tilde{x} \in \mathcal{T}_n$. In addition, we may also have access to some metadata $\mathcal{M}_n$ describing the new feature. This could be categorical data such as the category of a product in a recommender system or the topic of a question in an e-learning system, or some richer data format such as images or text.

We wish to adapt the machine learning model $p_{\theta_0}(x_U|x_O)$ to $p_\theta(\widetilde{x_U}|x_O)$ for data points in the target set $x \in \mathcal{T}_n$, so that it is able to accurately predict the value of the unobserved new features. A naive strategy would ignore the previous model $p_{\theta_0}(x_U|x_O)$ and instead seek the maximum likelihood estimates (MLE) of the parameters for the new model $p_\theta(\widetilde{x_U}|x_O)$. This is typically done by training the new model on the context set, by temporarily moving the observed new features $x_n$ to the prediction targets:

$$[\hat{\theta} = \text{argmax}_\theta [\Sigma_{\tilde{x} \in \mathcal{C}_n} \log p_\theta(x_n, x_U|x_O)]$$

However, in deep neural networks, the number of model parameters $\theta$ may be extremely large, so that maximising this log-likelihood is very expensive, particularly if new features are being introduced on a regular basis. Furthermore, optimising $\theta$ for one particular feature may lead to poor performance for another, as is the case in catastrophic forgetting in continual learning tasks. In order to address both of these concerns, we divide the model parameters into parameters $\theta_0$ inherent from the old model, and feature-specific parameters $\theta_n$ associated solely with the new feature. In other words, we use $p_{\theta_0}(x_U|x_O)$ as a base model and pose a factorisation assumption on the augmented model as $p_\theta(\widetilde{x_U}|x_O) = p_{\theta_0}(x_U|x_O) p_{\theta_0}(x_n|x_O; \theta_n)$, which together yield a predictive model for the new feature. We then hold $\theta_0$ fixed and only seek MLEs for $\theta_n$.

With this adapted model, the MLE estimates for the feature-specific parameters can be obtained by $$[\widetilde{\theta_n} = \text{argmax}_{\theta_n}[\Sigma_{\tilde{x} \in \mathcal{C}_n} \log p_{\theta_0}(x_n|x_O; \theta_n)]$$

While this greatly reduces the dimensionality of the parameter space over which we optimize for a new feature, and decouples the optimization of parameters for one new feature from another, several issues still exist. This factorization still requires a gradient descent procedure, which can be computationally costly and risks severe overfitting when there is little data for the new feature. Furthermore, it is not immediately clear how to make the estimation of $\theta_n$ depend on the feature metadata $\mathcal{M}_n$.

To address these problems, we introduce a Contextual HyperNetwork (CHN) $H_\psi(\mathcal{C}_n, \mathcal{M}_n)$, an auxiliary neural network that amortizes the process of estimating $\theta_n$. The goal is that after training the CHN and when a new feature $x\_\{n^*\}$ is added at test time, the CHN will directly generate "good" parameters $\widetilde{\theta_n} = H_\psi(\mathcal{C}_n, \mathcal{M}_{n^*})$ such that the new predictive model $p_{\theta_0}(x_{n^*}|x_O; \theta_{n^*}=\widetilde{\theta_{n^*}})$ can predict the values of the new feature accurately.

Suppose we have a set of data points (examples) with features, some of which are observed and others unobserved. We can represent these data values as $x_{i,j}^O$, where $(i,j) \in \mathcal{O}$ and $\mathcal{O}$ denotes the observed values. These values may be binary, discrete or continuous, and may or may not bounded. The generative model makes predictions $\tilde{x}_{i,j}^U$ for the missing values $x_{i,j}$ for $(i,j) \in \mathcal{U}$, given the observed values $x_{i,j}^O$ and data point and/or feature metadata $m_i^D$ and $m_j^F$ as input. This metadata could take any form, from numerical or categorical information to text or images.

Suppose a new feature j' is introduced to the system, with associated metadata $m_{j'}^F$, and possibly a small number of observed values $x_{i,j'}^O$ (the few-shot learning setting). We wish to design a system which can accurately predict the unobserved values $x_{i,j'}^U$, on initialisation, and whose performance will rapidly converge to an optimum in a small number of training steps. We also hope to see rapid increases in prediction accuracy on initialisation as the number of observed values for the new feature increases.

Contextual HyperNetworks

Figure 10:
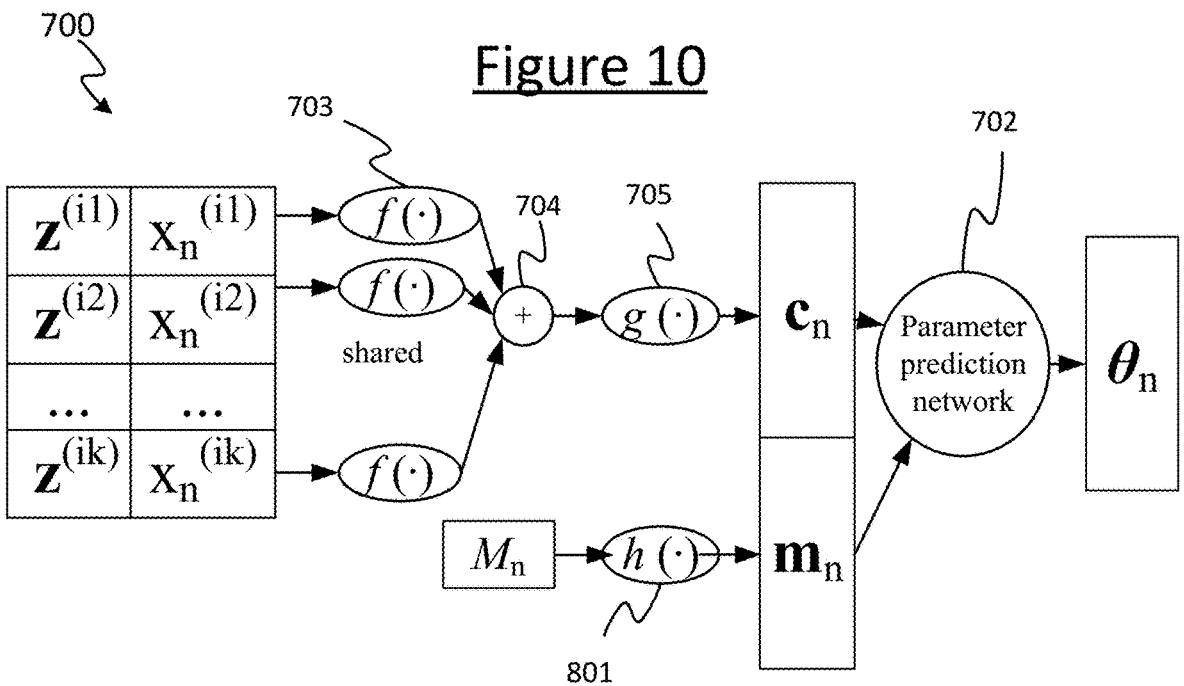

Our CHN aims to map the context set $\mathcal{C}_n$ and metadata $\mathcal{M}_n$ into an estimate of the new model parameters $\widetilde{\theta_n}$. For this, the CHN should be based on a network architecture that can receive as input a set of context points $\mathcal{C}_n$ of varying size for different features. This challenge is addressed through the use of a PointNet-style set encoder. First, for each context point $\tilde{x}^{(i)} \in \mathcal{C}_n$, we concatenate the new feature $x_n^{(i)}$ with a fixed-length encoding $z^{(i)}$ (see below) of the other observed features $x_O^{(i)}$ within the data point. Each of these concatenated vectors $[z^{(i)}, x_n^{(i)}]$ is then passed through a shared neural network $f(\cdot)$, and the outputs $f([z^{(i)}, x_n^{(i)}])$ are aggregated with a permutation-invariant function such as summation in order to produce a single, fixed-length vector. Finally, this output is passed through a second neural network $g(\cdot)$ to produce a fixed-length encoding of $c_n$ we term a "context vector". This architecture is displayed in FIG. 10.

The fixed length encoding $z^{(i)}$ of the observed features $x_O^{(i)}$ for each context data point $\widetilde{x^{(i)}} \in C_n$ is obtained using the base model $p_{\theta_0}(x_U|x_O)$'s internal representation of $x_O^{(i)}$: in an autoencoder model, this could be the encoded vector representing the data point at the information bottleneck, while in a feed-forward model it could be the output of an intermediate layer. Since these encodings depend only on the existing observed data $x_O^{(i)}$ and not any new features, they can be pre-computed and cached, so that only a single forward pass through the CHN is required upon the arrival of a new feature.

Additionally, the feature metadata $\mathcal{M}_n$ is passed through a neural network $h(\cdot)$ to produce a fixed length metadata embedding vector $m_n$. In the case of image or text metadata, specialized architectures such as convolutional neural networks or sequence models can be used here. The concatenated vector $[c_n; m_n]$ is then input into a final feed-forward neural network which produces the new feature-specific parameters $\widetilde{\theta_n}$.

In our experiments, we apply a CHN to an autoencoder-style model; the augmented model adds a new head to the PVAE decoder (see environment 900 of FIG. 11) and performs conditional inference for the new feature values given previous observations. Therefore the feature-specific parameters $\theta\_n$ in the augmented model correspond to the head parameters $\theta\_n$-$\phi\_n$ in FIG. 13.

Training CHNs with Meta-Learning

Figure 12:
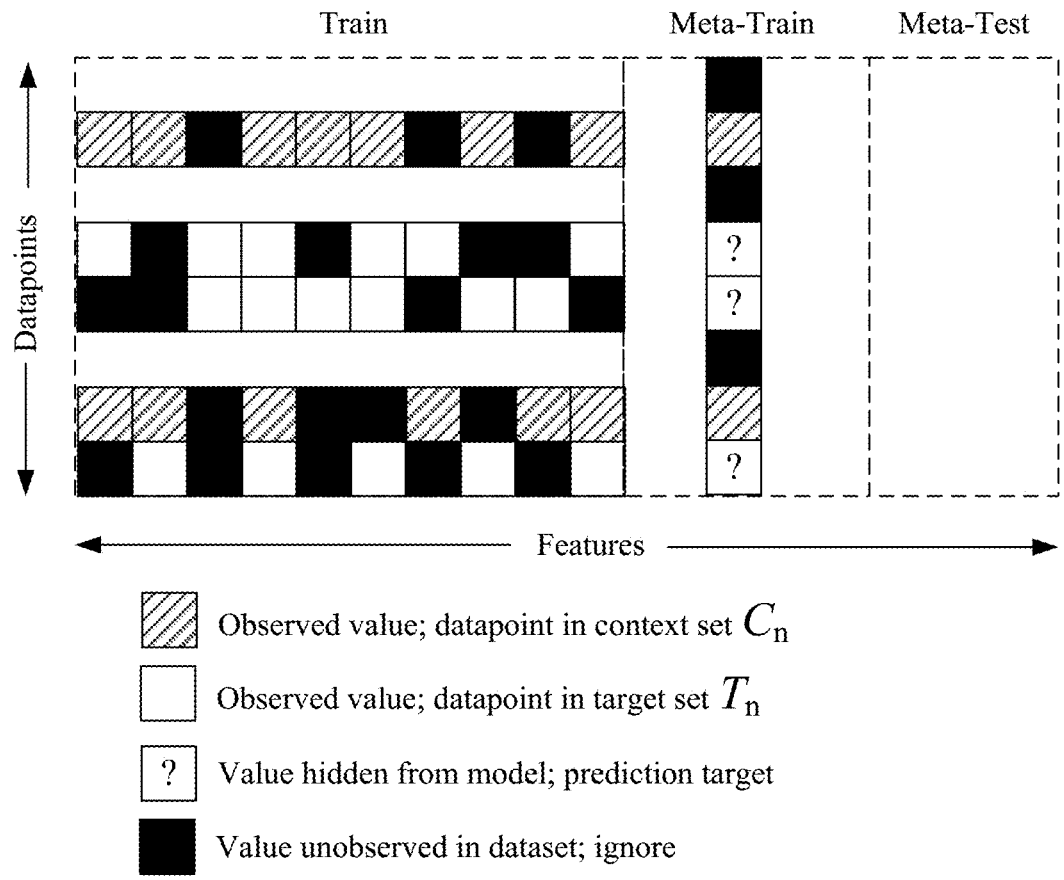

We adopt a meta-learning approach to training the CHN, treating each new feature as an individual task with the aim of producing a model that can "learn how to learn" from $C_n$ and $\mathcal{M}_n$. We assume a base model $p_{\theta_0}(x_U|x_O)$ is trained on the data observed before the adaptation stages. The base model is then frozen during CHN training. To implement the training strategy, in the experiments we divide the dataset into three disjoint sets of features (see FIG. 12): a 'training' set for base model training in the first stage, a 'meta-training' set for CHN meta-learning in the second stage, and a meta-test set for CHN evaluation in the third stage.

Meta-Training of the CHN

During meta-training, the parameters $\theta_0$ of the base model are frozen, and we now aim to learn the parameters $\psi$ of the CHN. We iterate the following training steps in mini-batches of features $\mathcal{B}$ sampled from the meta-training set for every step:

For each feature n in $\mathcal{B}$, sample $k_n$ data points in which this feature is observed to form the context set $C_n$, and reveal the associated feature values to the model. In our experiments we sample $k_n$~Uniform[0, . . . , 32] to ensure that a single CHN can perform well across a range of context set sizes.

For each feature $n \in \mathcal{B}$, compute feature-specific parameter predictions using the CHN, $$\widetilde{\theta_n} = H_\psi(C_n, \mathcal{M}_n)$$

3. item For each feature $n \in \mathcal{B}$, estimate the log-likelihood of the CHN parameters $\psi$ given the ground truths for the hidden values of the feature n in the data points in its target set $\mathcal{T}_n$, using the augmented model $p_{\theta_0}(x_n|x_O, \widetilde{\theta_n})$:

$$l(\psi) = \tfrac{1}{\sum_{n \in \mathcal{B}} |\mathcal{T}_n|} \Sigma_{n \in \mathcal{B}} \Sigma_{\{i | x^{(i)} \in \mathcal{T}_n\}} \log p_{\theta_0}(x_n^{(i)} | x_O^{(i)}; \widetilde{\theta_n})$$

4. Update the CHN parameters by taking a gradient ascent step in $\psi$ for $l(\psi)$.

Note that the log-likelihood is only computed for the hidden values of the new feature in the target set $\mathcal{T}_n$, and not for the observed values in $C_n$. This is to ensure that the CHN produces parameters which generalize well, rather than overfitting to the context set.

Evaluating the CHN

At evaluation time, the parameters of both the base model and the CHN are now frozen. A fixed context set and metadata are provided for each feature in the meta-test set, and these are used to initialize feature-specific parameters for the meta-test features using the trained CHN. These parameters are then used to make predictions for all of the target set values for the new features, and these predictions are used to compute evaluation metrics.

Related Work

CHNs aim to solve the problem of adapting to a new feature with very few available observations, and thus relate to few-shot learning and related fields such as meta-learning and continual learning. From a technical point of view, we use an auxiliary neural network to amortize the learning of parameters associated with the new feature, which falls under the domain of hypernetworks. Furthermore, in the context of recommender systems, a number of related methods have been proposed to address the cold-start problem. We thus discuss related work in these three areas.

Few-Shot Learning

Few-shot learning is the problem of designing machine learning models that can adapt to new prediction tasks given a small number of training examples. A popular approach to this problem is that of meta-learning, where the goal is to design models that can rapidly adapt to new tasks. Meta-learning approaches seek a parameter initialisation $\theta$ that can rapidly adapt to tasks drawn from a task distribution $p(\mathcal{T})$ within a small number of gradient descent steps. These methods do not directly condition the parameter initialisation for a new task on any associated data or metadata, instead relying on fine-tuning by gradient descent, which can be both computationally expensive and lead to severe overfitting when little data is available. Several methods seek to adapt a classifier to a task based on a context set of class examples. For instance, by embedding class examples to provide a nearest neighbours classifier, learning an attention mechanism between class examples and a new example, or modulating activation functions within a feature extractor conditioned on the context set. Conditional Neural Adaptive Processes (CNAPs) adapt both classifier and feature extractor parameters based on the context set for a task. However, in all cases, each task is treated as independent from all others, whereas CHNs explicitly utilize previously-observed features when adapting to a new feature. A closely related field is that of continual learning, where a model seeks to adapt to new tasks or a shifting data distribution while avoiding catastrophic forgetting of old tasks. CHNs can be seen as a means of addressing continual learning, by generating parameters for a new feature conditioned on all of the features already learned by the model.

Hypernetworks

Hypernetworks are auxiliary neural networks which generate the parameters of a neural network. They were introduced in as a form of model compression, with the hypernetwork taking as in input only structural information about the weight matrix they are currently predicting, such as its index in a sequence of layers. By contrast, CHNs are explicitly conditioned on data relevant to the weights currently being predicted. A hypernetwork learns to generate model weights $\theta_t$ for a task t given a learned task embedding $e_t$ with the goal of preventing catastrophic forgetting. In this case, the hypernetwork aims to learn the task embedding for each task as a form of data compression, by training on all of the data for the new task—by contrast, CHNs predict parameters associated with a new feature conditioned on the data associated with this feature, with no training required.

Cold Starts in Recommender Systems

Cold starts occur when there is little or no data associated with a novel item or user in a recommender system. Collaborative filtering approaches to recommender systems have enjoyed great success for many years, but can fail completely when there is very limited rating data associated with a new user or item. One potential solution to cold starts is given by content-based methods, which use any available descriptive information about the new user or item. Hybrid approaches seek to marry these two approaches, making use of both collaborative and content-based methods. Meta-learning approaches also show promise for solving cold starts, including MAML-like approaches for initialising new items, or adapting either the weights of a linear classifier or the biases in a neural network based on a user's history. When applied to recommender systems, CHNs combine the strengths of all of these approaches, using content information, ratings data and latent representations of the associated users to generate accurate parameters for novel items.

Experiments

In this section, we demonstrate the performance of the proposed CHN in three different real-world application scenarios, including recommender systems, healthcare and e-learning. Our method exhibits superior performance in terms of prediction accuracy across all these applications. We also demonstrate an advantage in terms of computational efficiency in a large scale real-life setting, and perform an ablation study to investigate the effects of the feature metadata $\mathcal{M}_n$ on the CHN's performance.

Experiment Settings

In all our experiments, we apply a CHN to a partial variational autoencoder (P-VAE) as an exemplar model. This is a flexible autoencoder model that is able to accurately work with and impute missing values in data points, allowing us to model sparsely-observed data such as that found in recommender systems. For each new feature n, we augment the P-VAE's decoder with a new decoder head consisting of an additional column of decoder weights $w_n$ and an additional decoder bias term $b_n$ which extend the model's output to the new feature, so that $\theta_n = \{w_n, b_n\}$. See FIG. 13 for an illustration. Where multiple baselines are considered at meta-test time, these are all applied to the same trained PVAE model to ensure a fair comparison between methods.

For all experiments, we train the CHN to output accurate feature parameters based on a range of context set sizes $k\epsilon[0, \ldots, 32]$ by randomly sampling k on each occurrence of a meta-training set feature. We then evaluate the performance of the CHN and baselines on the meta-test set features for a fixed range of context set sizes, ensuring that the same context sets are revealed to the CHN and each baseline. All results are averaged across 5 random train/meta-train/meta-test feature splits. Hyperparameters and model architectures were tuned on different data splits to those used in the final experiments.

We consider the following baselines for generating the new feature parameters $\theta_n = \{w_n, b_n\}$. All methods are applied to the same base trained P-VAE model to ensure a fair comparison.

Random: Generate a random value for $\theta_n$ for each new decoder head using Xavier initialisation for weights and 0 for biases.

Mean Imputing: Set weights and biases to always predict the mean of the observed values for the new feature in the context set, i.e.

$$w_n = 0 \text{ and } b = \sigma^{-1}\left(\frac{1}{k}\Sigma_{i \in \mathcal{C}_n} x_n^{(i)}\right).$$

Mean Head Parameters: Generate the new head parameters $\theta_n$ as the mean of all of the head parameters learned on the training set features.

Mean Head Parameters (Matching Metadata): As above, but averaging only over parameters of heads whose associated feature has metadata matching that of the new feature. In the case of MovieLens 1M and the e-learning dataset, this is defined as any existing feature who one-hot encoded metadata is a subset of the one-hot encoding of the new feature. For example, if a new movie has the genres Action and Comedy, we would average the head parameters of all movies with genres Action, Comedy and Action+Comedy.

Zero Imputing: Predict 0 for all unobserved values. Useful as a baseline for the MNIST dataset, where a large fraction of each data point is 0.

k-Nearest Neighbour Head Parameters: Generate the new head parameters $\theta_n$ as the mean of the head parameters of the k-nearest neighbour features in terms of Euclidean distance, where column-wise mean imputing is used to fill in unobserved values. % In the case of sparsely-observed datasets, we first perform mean imputing for each feature, filling unobserved values for the feature with the mean observed value for that feature. The k-nearest neighbours are then computed between the new feature column and the feature columns in the training set. In practice, we find that a value of k=10 performs well.

Train from Random: Initialize the new feature head parameters randomly, and then fine-tune these parameters on the data in the context set $\mathcal{C}_n$ for a fixed number of epochs. Note that all other weights in the PVAE are frozen during this process.

MAML: We meta-learn an initialisation of $\theta_n$ using Model-Agnostic Meta Learning, where we treat the prediction of each feature as a separate task and fine-tune these parameters on the context set. In all experiments, we compare with the MAML baseline which has the best-performing number of fine-tuning epochs.

Recommender Systems

In real-life recommender systems, new users and new items are continuously added as new customers join and new products are launched. In deep learning based frameworks, the deep neural networks are commonly used in a user-based manner. In this approach, each new user is treated as a new data point, while each new item is treated as a new feature. To add a new item, one must extend the network architecture to incorporate the new feature, and we propose CHNs as an efficient way to predict the parameters associated with the new feature.

We evaluate the scenario above with MovieLens-1M dataset. The dataset consists of 1 million ratings in the range 1 to 5 given by 8094 users to 5660 movies, and is thus 2.2% observed. We treat each user as a data point, and predict the ratings they give to movies in the meta-testing set conditioned on their ratings for movies in the training set. For each movie, we have associated metadata $\mathcal{M}_n$ giving a list of genres associated with the movie, such as Action or Comedy, which we encode in a binary format, alongside the year of release which we normalize to lie within [0, 1]. For each random data split, we sampled 60% of movies as training data to train the base P-VAE model, used 30% as a meta-training set for CHN training and used the remaining 10% as a meta-test set. We see that the CHN performs well across all values of k, whereas many baselines either overfit in the low-data regime or underfit in the higher-data regime. Furthermore, the CHN outperforms MAML for all values of k, without requiring any parameter fine-tuning.

Figure 14:
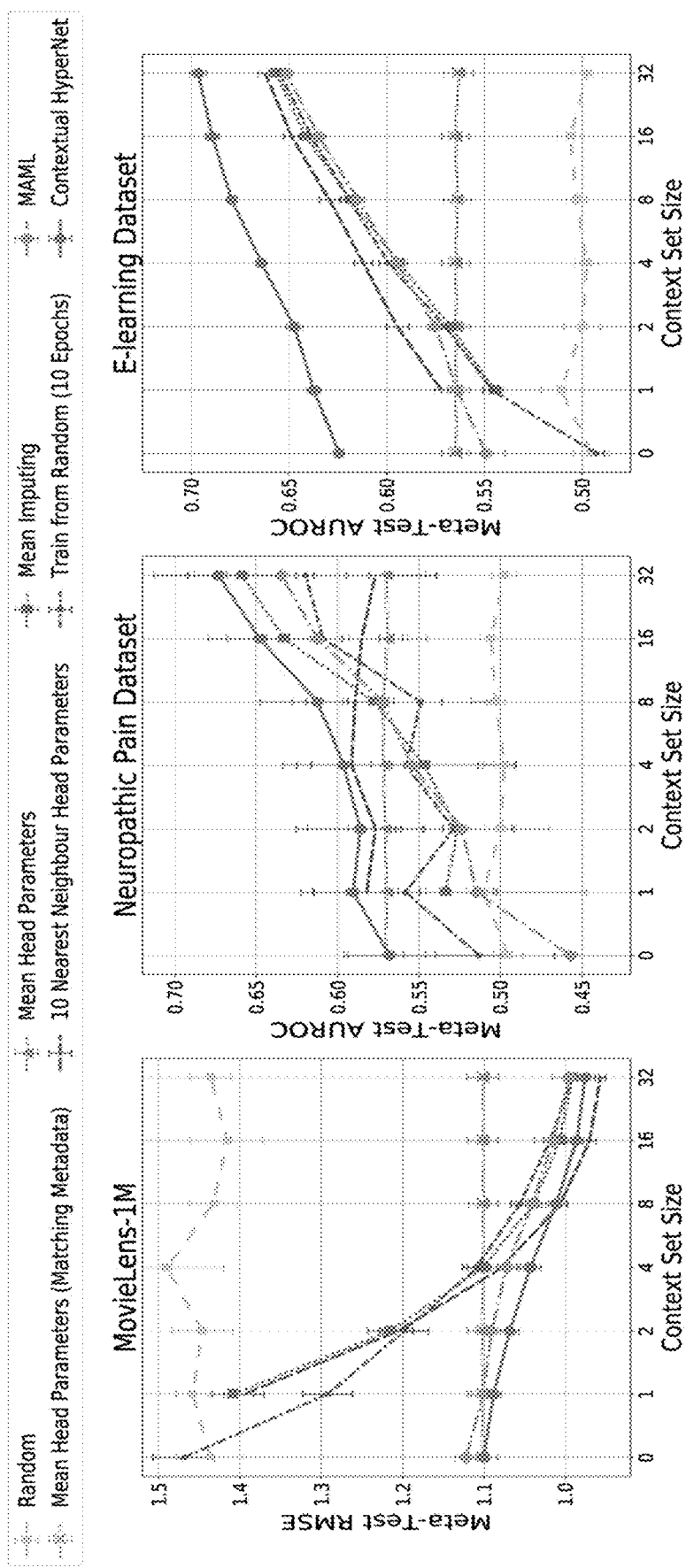
FIGS. 14 to 18b show experimental data obtained from an example auxiliary network.
Figure 15:
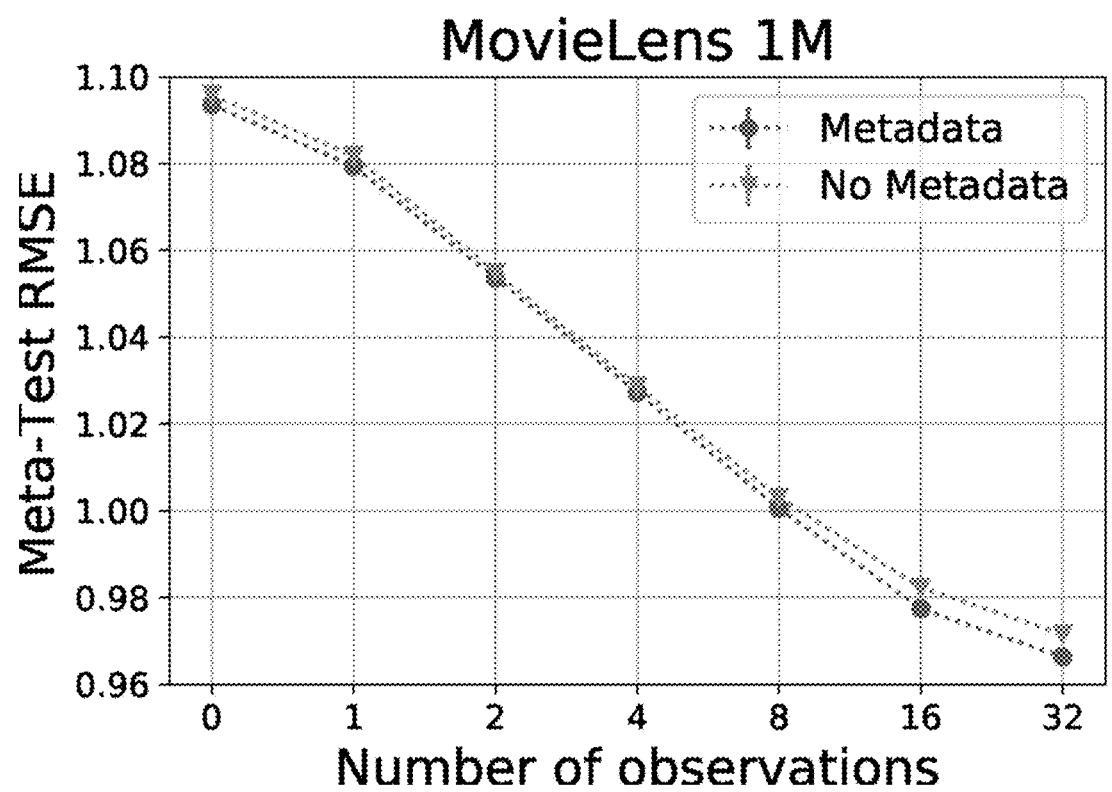

The plot in FIG. 14a shows the performance of our proposed CHN, comparing with all other baselines in terms of RMSE (lower is better). In particular, our method has clear advantages over MAML and the Train from Random baselines which utilize the rating of the new movies. Compared to the 10-nearest neighbour baseline which performs slightly better with larger context sets, in the low-data regime (k≤8) CHN can more efficiently use these few-shot ratings and obtain better recommendation accuracy for the new items. FIG. 15 shows a comparison of CHN performance with and without metadata $\mathcal{M}_n$ as input, for a representative data split. We find that including metadata has a modest but typically positive effect on the CHN performance for small values of k.

Healthcare

In healthcare applications, a new question is often added to an existing health-assessment questionnaire, and in hospitals, new medical devices may be introduced to make physiological measurements. In this case it is desired for a model to quickly adapt to the newly added feature for health assessment, even when relatively few tests have been administered and so data is scarce.

Another potential application domain for CHNs is in medical settings, one example being the arrival of a new diagnostic test. CHNs may assist in determining patients who are more likely to yield a positive diagnosis from a new test based on their existing medical records, even when relatively few tests have been administered and so data is scarce. This would allow the testing to be targeted towards those predicted to be most likely at risk, which is crucial when testing resources are limited, or when tests are painful or invasive.

We assess the utility of CHNs in a healthcare setting using synthetic data generated by the Neuropathic Pain Diagnosis Simulator. This simulator produces synthetic data using a generative model to simulate pathophysiologies, patterns and symptoms associated with different types of neuropathic pain. The data is binary, where a 0 represents a diagnostic label that is not present in a patient's record, and a 1 indicates a diagnostic label that is present. We simulated 1000 synthetic patients, and removed features with fewer than 50 positive diagnoses, resulting in 82 remaining features, with 17.3% of the values in the dataset being positive diagnoses. We used 50% of the features as training set; 30% of the features as the meta-test set and 20% of the features as the meta-test set.

The plot in FIG. 14b shows the results in terms of AUROC (higher is better), as the dataset is highly imbalanced. Our method consistently outperforms all baselines across all values of k, while many methods including MAML suffer from severe overfitting when k is small. In contrast to the MovieLens-1M result, here the 10-nearest neighbour approach does not seem to leverage more datapoints in the context set. This shows that our method is desirable in the cost-sensitive healthcare environment, even for highly imbalanced medical tests where results are largely negative.

E-Learning

Finally, we foresee CHNs being valuable in online education settings, potentially allowing teachers to quickly assess the diagnostic power of a new question given a small number of answers, or to gauge whether a new question's difficulty is appropriate for a particular student.

We assess the performance of the CHN in an e-learning setting using a real-life dataset provided by a e-learning provider for 8094 students across 5660 questions, detailing whether or not a student answered a particular question correctly. The dataset contains 2.8 million responses, making it 6.1% observed. We treat each student as a data point and each question as a feature, and use a binary encoding of each question's associated subjects as metadata. We used 60% of the questions as training set; 30% of the questions as the meta-test set and 10% of the questions as the meta-test set.

The plot in FIG. 14c illustrates the performance on prediction on the unseen meta-test set in terms of AUROC. Our method shows a substantial improvement over the considered baselines over the entire range of k. One potential explanation is that much larger number of observations and features in this real-world dataset allow the CHN to generalize much more effectively. This would suggest real promise for applying CHNs in large-scale, real-world settings, and future work may wish to explore the performance of CHNs on larger datasets than this.

One motivation behind the design choices for CHNs was the aim of achieving a significant reduction in processing time when compared against other parameter initialisation methods which yield good predictive performance. In this experiment, we time the amount of time taken to initialise parameters for each feature in the meta-test set of the e-learning dataset, averaged over the whole meta-test set using a batch size of 128.

In addition, we use this large scale dataset to show the computation time for generating new feature parameters at meta-test time using a number of methods. The results are shown in Table 1. We see that the CHN offers nearly a 4-fold speedup compared to the nearest-neighbours based approach. We see a similar difference in performance when compared to training the new heads on a single observation for just 10 epochs. Moreover, while this training time grows rapidly with the number of observations in the context set, the time taken for a CHN remains nearly constant since it amortizes the gradient descent process, making CHNs an extremely efficient initialisation choice for larger context set sizes.

TABLE 1

| Method/K | 1 | 4 | 16 |
|---|---|---|---|
| 10-NN | 400.8 ± 0.5 | 402.3 ± 2.1 | 405.1 ± 1.5 |
| T Random (1 Epoch) | 47.4 ± 4.5 | 61.3 ± 4.7 | 89.2 ± 4.4 |
| T Random (5 Epochs) | 210.9 ± 20.4 | 270.7 ± 18.4 | 331.1 ± 20.0 |
| T Random (10 Epochs) | 414.9 ± 38.6 | 530.3 ± 35.9 | 651.7 ± 38.8 |
| Contextual HyperNet | 1137.7 ± 1.1 | 116.5 ± 1.0 | 119.9 ± 1.3 |

Discussion

We see that in all cases, the CHN shows strong performance against all baselines across all values of k. While k-nearest neighbour and fine-tuning approaches show poor performance in the low-data regime due to overfitting, the CHN appears to have a regularising effect on the parameter initializations. However, this does not prevent the CHN from utilizing larger context set sizes, and we observe a significant increase in performance as the number of observations grows across all datasets, demonstrating that the CHN is not simply learning a single constant parameter initialisation, but is making effective use of the input context set and metadata.

Conclusion

We introduce Contextual HyperNetworks (CHNs), providing an efficient way to initialize parameters for a new feature in a model given a context set of points containing the new feature and feature metadata. Our experiments demonstrate that CHNs outperform a range of baselines in terms of predictive performance across a range of datasets, in both regression and classification settings, and are able to perform well across a range of context set sizes, while remaining computationally efficient. In the future work, we will evaluate CHNs in streaming setting with large-scale real-world applications.

Partial Variational Autoencoders

For our experiments, we base our model on a Partial Variational Autoencoder (P-VAE)—this model combines a traditional variational autoencoder (VAE) model with a PointNet-style set encoder, allowing it to efficiently encode and reconstruct partially observed data points. The P-VAE is based on the observation that typically the features in a VAE are assumed to be conditionally independent when conditioned on the latent variable z. That is, $$p(x|z) = \Pi_j p(x_j|z)$$

Then, given a data point x with observed features $x_O$ and unobserved features $x_U$, we have that $$p(x_U|x_O, z) = p(x_U|z)$$

Hence, if we can infer a posterior distribution over z from the observed features, we can use this to estimate $p(x_U|x_O)$. The P-VAE infers a variational posterior distribution over z using an amortized inference network (or encoder network) $q_\theta(z|x_O)$ and approximates the conditional data distribution given a value of z using a decoder network $p(x_O, x_U|z)$.

In our model, we extend the decoder to decode the value of a new feature $x_n$ by initialising an additional subnetwork in the decoder which we term a decoder head, with parameters $\phi_n$, to extend its output dimension by one. In principal this head could be of any architecture which takes as input the output of the shared layers of the decoder, but in practice we found that simply extending the final layer of weights and biases to accommodate a new output dimension yielded good results while remaining parameter-efficient as the number of output features grows.

Training P-VAEs

The P-VAE is trained to reconstruct observed features in the partially-observed data point, and in the process learn to infer a variational posterior $q_\theta(z|x_O)$ over the latent variable z. The P-VAE is given batches of data points where features from both the meta-train and meta-test sets are hidden from the model. Additionally, each time a particular data point is input, some additional features are also randomly hidden from the model using a Bernoulli mask, in order to ensure the model is robust to different sparsity patterns in the data. The P-VAE is then trained by maximising the Evidence Lower-Bound (ELBO):

$$\log p(x_O) \geq \log p(x_O) - D_{KL}(q(z|x_O) || p(z|x_O)) =$$

$$E_{z \sim q(z|x_O)}[\log p(x_O, x_U|z)] - D_{KL}(q(z|x_O) || p(z|x_O)) = \mathcal{L}_{partial}(x_O)$$

Baselines

Here we provide additional details and results for the baselines used in our experiments.

MAML

We adapt the Model-Agnostic Meta Learning technique as a baseline. The decoder head parameters $\theta_n$ are adapted using the MAML algorithm in the 'meta-training' stage. Each new feature $\mathcal{X}$ is viewed as a separate MAML task, with some observed and unobserved values. We sample the tasks in batches of size M and train the inner (a.k.a. fast) model over N steps. The inner model training loss is the ELBO of the PVAE on the observations $\mathcal{L}_{x_O}$. The meta-model (a.k.a. the slow or outer model) is trained by being given the context set observations, and computing a reconstruction loss on the target set, $\widehat{\mathcal{L}_{T,C}}$ ($f_\theta$, $\mathcal{X}$). The gradient for the meta-model update is taken over the batch reconstruction losses mean.

Consistently with other experiments, we use the following predictive losses: mean-square error for continuous data and binary cross-entropy for binary data. The context set sizes k int meta-training and meta-evaluation are handled in the same way as for the CHN experiments. In meta-evaluation, the same context and target sets within the "Meta-Test" feature subset as in other experiments are used, and the same evaluation metrics are employed. Notably, since MAML aims to fit parameters that adapt quickly to new tasks, it allows for fine-tuning at evaluation time, that is, training the model for several iterations from the MAML parameter initialization. Here, we evaluate the model with and without fine-tuning.

In the MAML baseline experiments we use M=4, N=10, with learning rate $\alpha=\beta=10^{-2}$ for inner and outer model optimization. The model fine-tuned performance is evaluated over {1, 3, 5, 10} epochs and beset results are used. We make use of the higher order optimization facilitated by the higher library in the implementation of this baseline.

Figure 16:
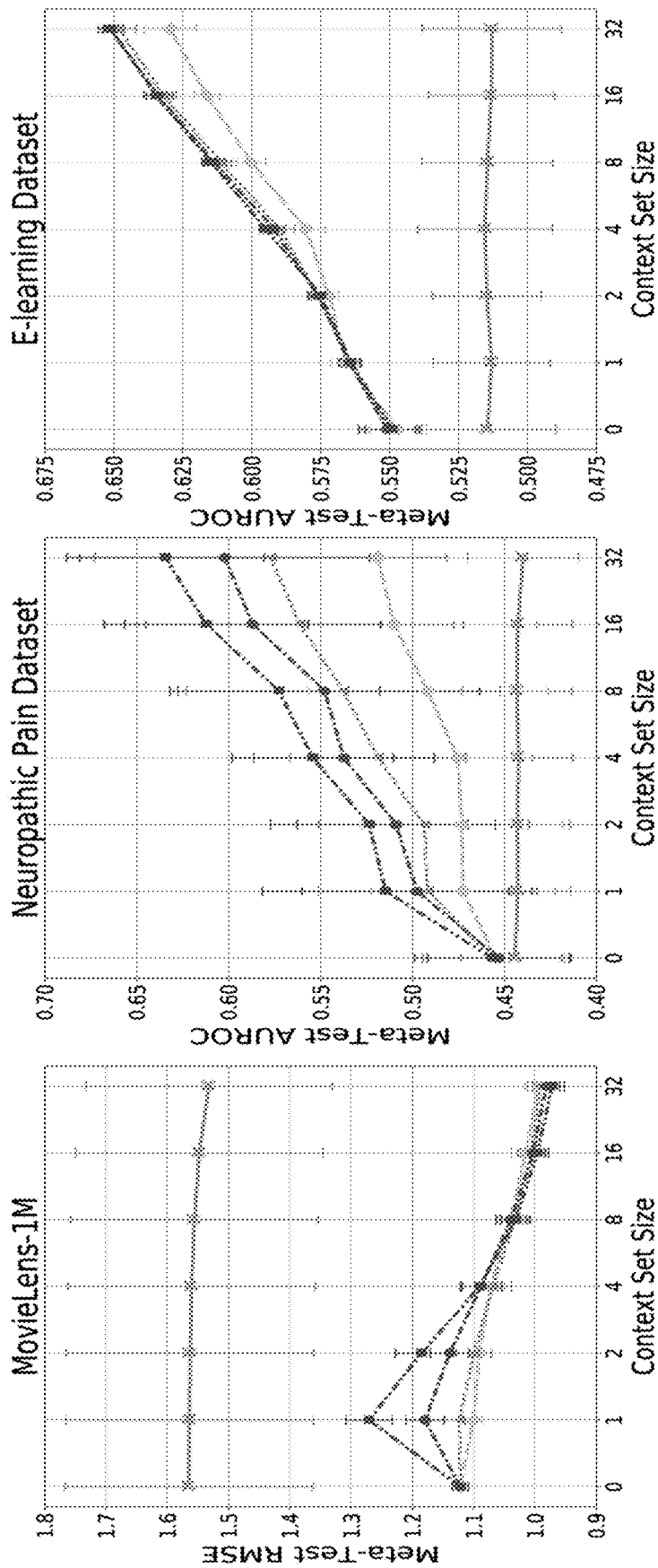

FIG. 16 shows the performance of the MAML baseline for different numbers of fine-tuning epochs and with no fine-tuning. As expected, the baseline with no fine-tuning is outperformed by those where fine-tuning is employed. For the Neuropathic Pain and E-learning datasets, the increase in the number of fine-tuning epochs corresponds to improvement in performance (greater AUROC), whereas in case of MovieLens-1M, performance drops (RMSE increases) with longer fine-tuning, particularly for the smaller context set sizes.

k-Nearest Neighbour Head Parameters

Figure 17:
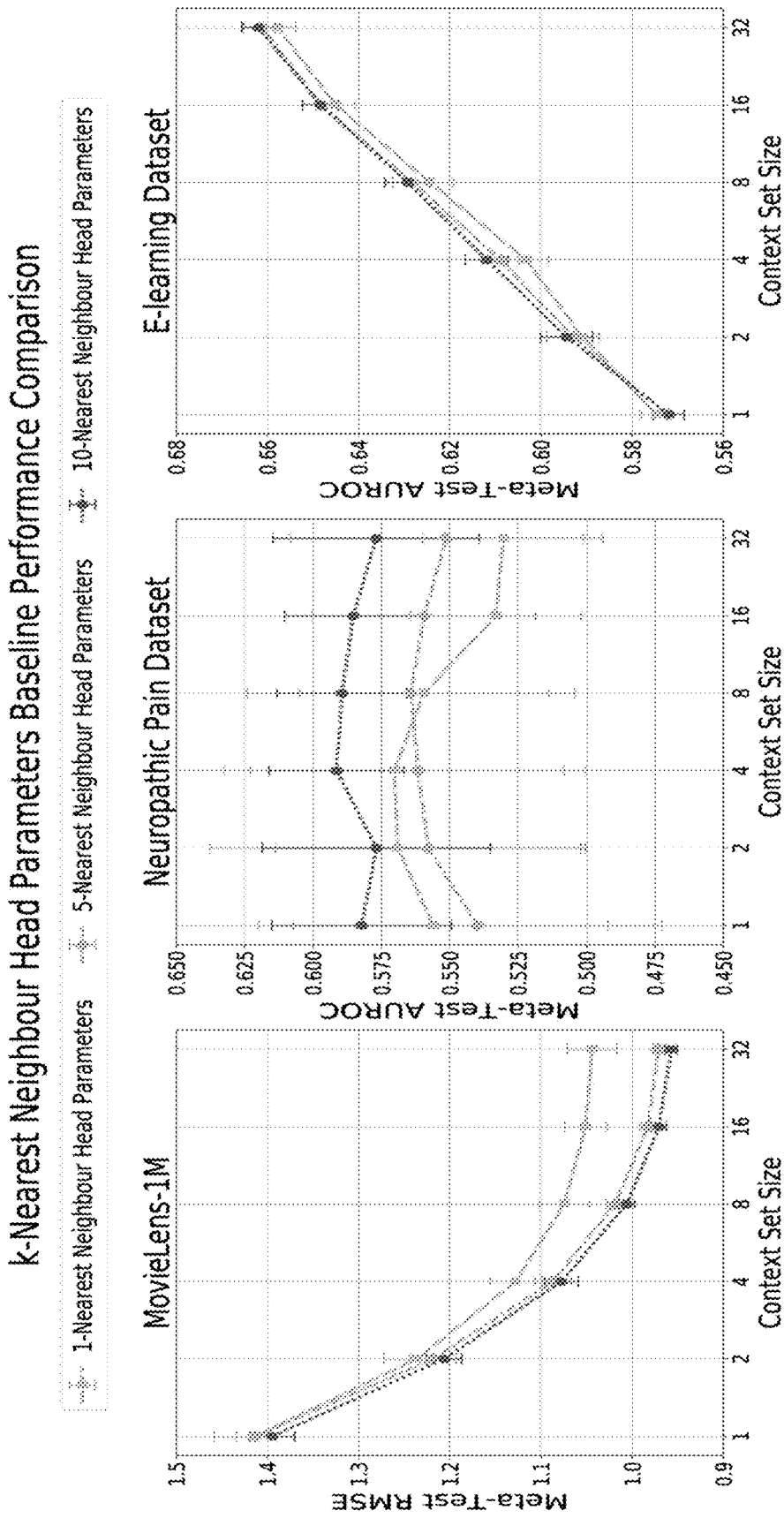

We consider k-Nearest Neighbour Head Parameters baselines for the values k∈{1, 5, 10}. FIG. 17 shows the performance of this baseline for the different values of k across a range of context set sizes. We expect that as k is increased further, and the number of head parameters averaged over grows, the behaviour will approach that of the mean head parameter baselines. In the main text, 10-Nearest Neighbours is used throughout, as it yields good performance in both the low and high-data regimes.

Fine-Tuning

Figure 18A:
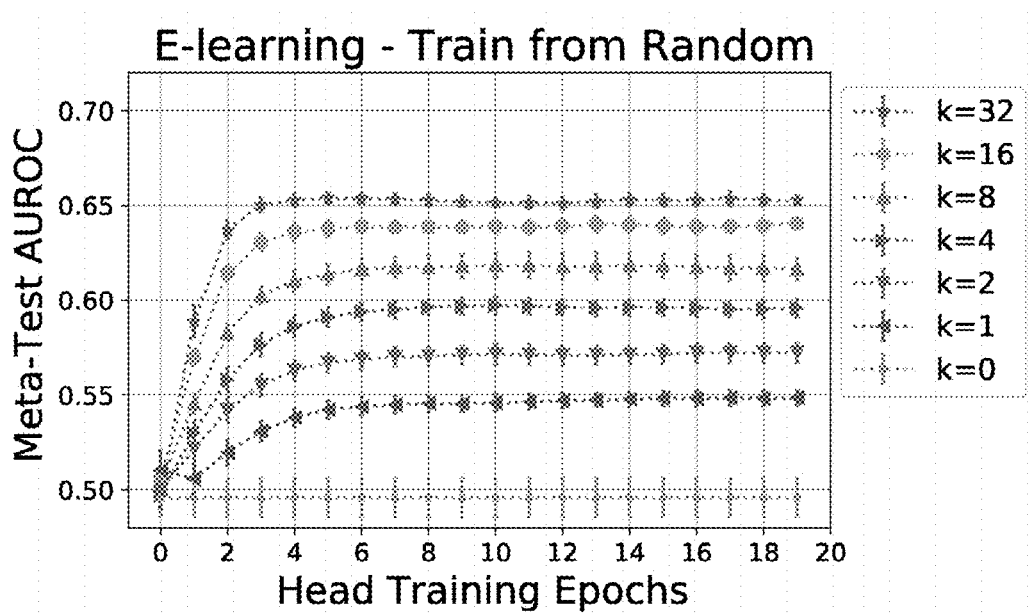

In our experimental results, we show the performance of training the new decoder heads on their context sets from randomly initialized parameters for 10 epochs. In FIG. 18a, we show the predictive performance of the P-VAE on the meta-test set after training randomly initialized head parameters for an increasing number of epochs, for a range of context set sizes k. We see that the performance improves with training in all cases, with better performance achieved as the context set size k increases, and thus the effect of over-fitting is lessened. We see that the performance has typically converged by around 10 epochs of training, and so this value was used as a benchmark in all of our experiments to provide a good trade-off between model performance and computational cost.

Figure 18B:
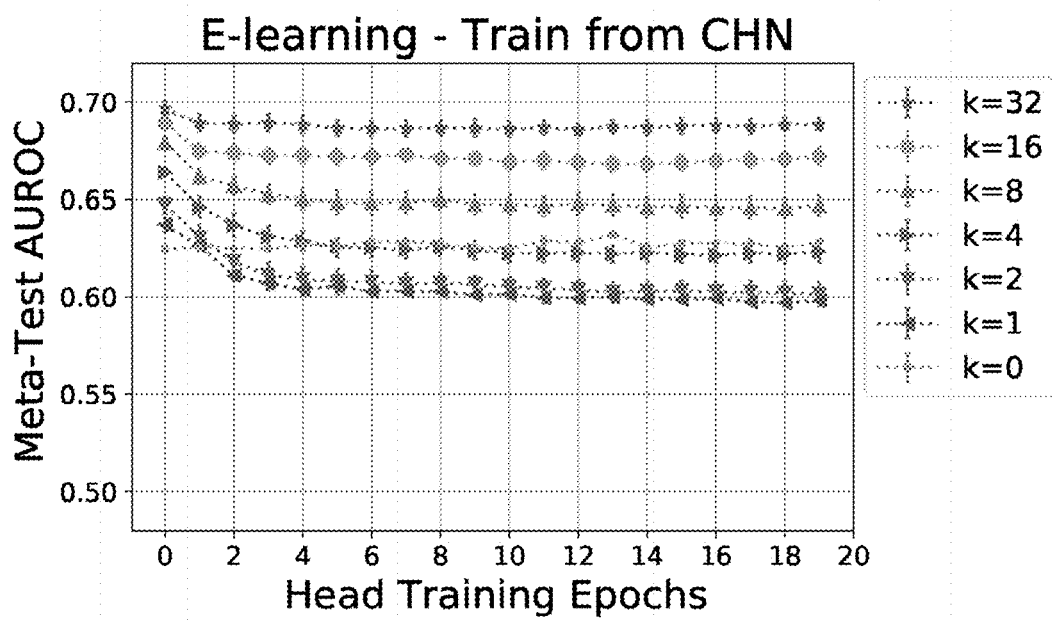

Furthermore, in FIG. 18b, we perform the same experiment but instead initialising the heads with the CHN parameters. We see that in all cases except k=0, training by gradient descent leads to a decrease in performance due to over-fitting, suggesting that the CHN has an implicit regularising effect on the parameter initialisation. We note also that in all cases, once training has converged, the parameters trained from the CHN initialisation outperform those trained from the random initialisation for all values of k.

Variational Auto-Encoders (VAEs)

Figure 11:
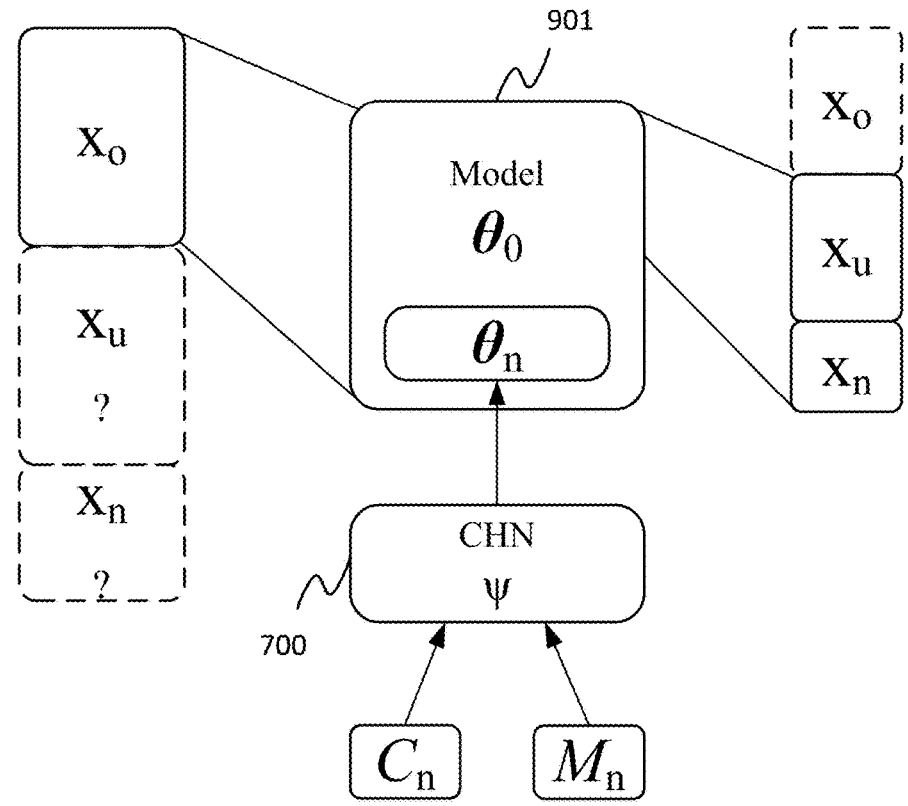
Figure 13:
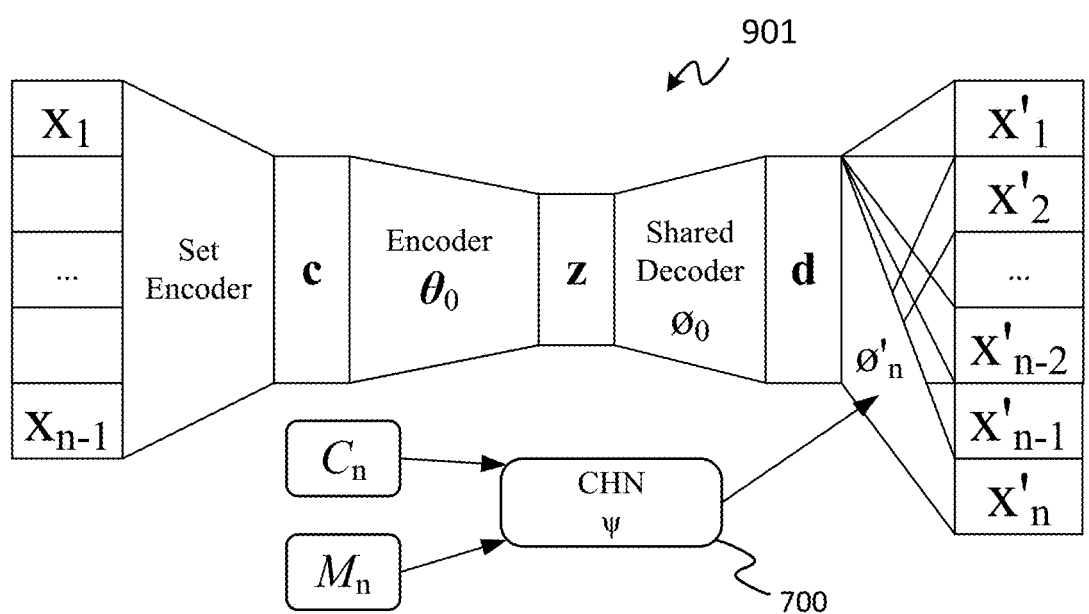

According to some embodiments, the primary model 901 may comprise a VAE. That is, the auxiliary model 700 may predict new model parameters for use by a VAE in predicting values of the new feature. In some examples, the primary model may comprise a partial VAE. A partial VAE is shown in FIGS. 11 and 13 and will be described below. Note that the primary model 901 may take other forms and is not limited solely to VAEs. An example VAE will now be described.

Figure 4A:
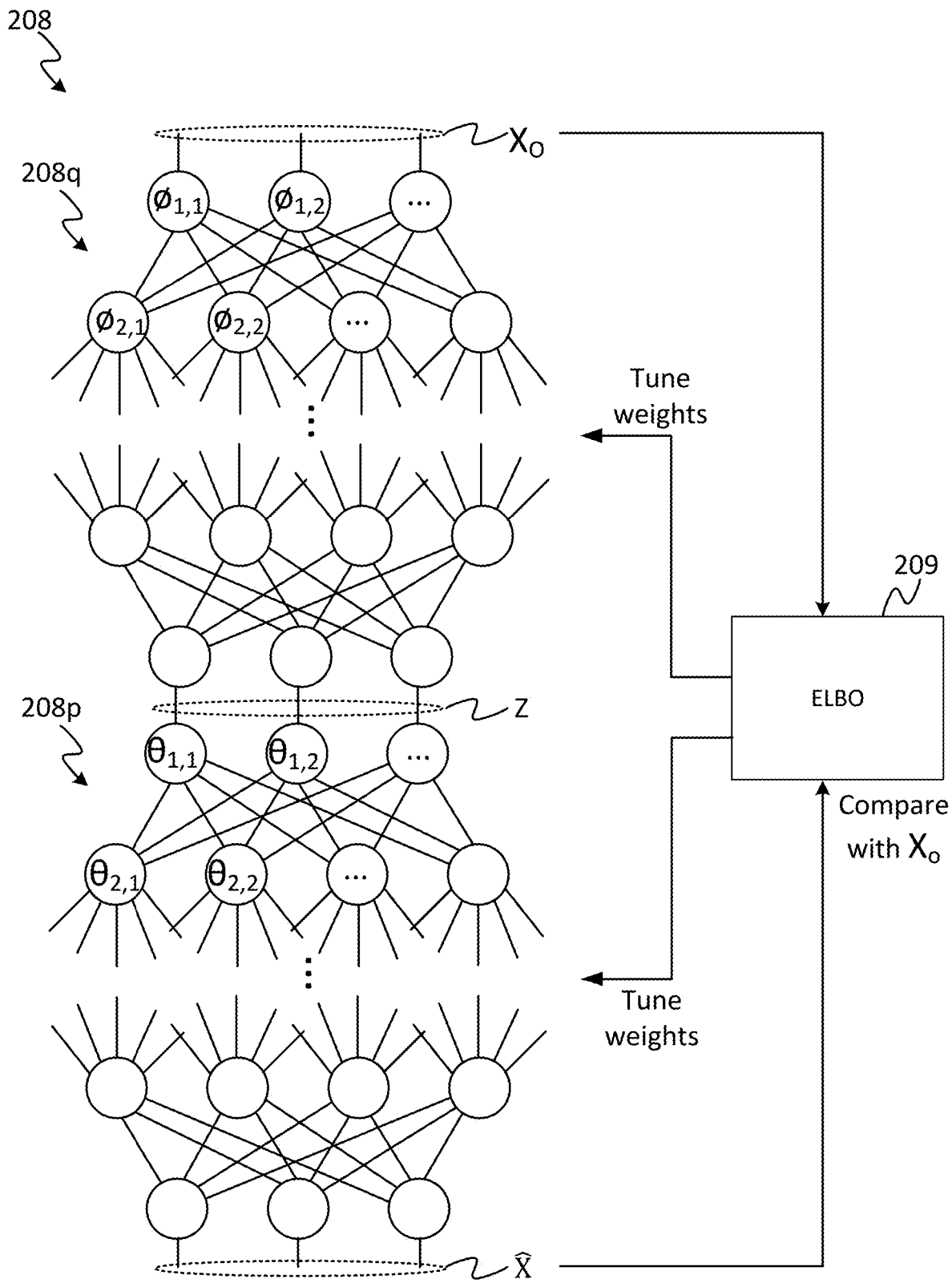

FIG. 4A schematically illustrates an example model known as a variational auto encoder (VAE). In this case the machine learning model 208 comprises an encoder 208q comprising an inference network, and a decoder 208p comprising a generative network. Each of the inference networks and the generative networks comprises one or more constituent neural networks 101, such as discussed in relation to FIG. 1A. An inference network for the present purposes means a neural network arranged to encode an input into a latent representation of that input, and a generative network means a neural network arranged to at least partially decode from a latent representation.

The encoder 208q is arranged to receive the observed feature vector Xo as an input and encode it into a latent vector Z (a representation in a latent space). The decoder 208p is arranged to receive the latent vector Z and decode back to the original feature space of the feature vector. The version of the feature vector output by the decoder 208p may be labelled herein $\hat{X}$.

The latent vector Z is a compressed (i.e. encoded) representation of the information contained in the input observations Xo. No one element of the latent vector Z necessarily represents directly any real world quantity, but the vector Z as a whole represents the information in the input data in compressed form. It could be considered conceptually to represent abstract features abstracted from the input data Xo, such as "wrinklyness" and "trunk-like-ness" in the example of elephant recognition (though no one element of the latent vector Z can necessarily be mapped onto any one such factor, and rather the latent vector Z as a whole encodes such abstract information). The decoder 208p is arranged to decode the latent vector Z back into values in a real-world feature space, i.e. back to an uncompressed form $\hat{X}$ representing the actual observed properties (e.g. pixel values). The decoded feature vector $\hat{X}$ has the same number of elements representing the same respective features as the input vector Xo.

The weights w of the inference network (encoder) 208q are labelled herein ø, whilst the weights w of the generative network (decoder) 208p are labelled θ. Each node 104 applies its own respective weight as illustrated in FIG. 4.

With each data point in the training data (each data point in the experience data during learning), the learning function 209 tunes the weights ø and θ so that the VAE 208 learns to encode the feature vector X into the latent space Z and back again. For instance, this may be done by minimizing a measure of divergence between $q_ø(Z_i|X_i)$ and $p_θ(X_i|Z_i)$, where $q_ø(Z_i|X_i)$ is a function parameterized by ø representing a vector of the probabilistic distributions of the elements of Zi output by the encoder 208q given the input values of Xi, whilst $p_θ(X_i|Z_i)$ is a function parameterized by θ representing a vector of the probabilistic distributions of the elements of $X_i$ output by the encoder 208q given $Z_i$. The symbol "|" means "given". The model is trained to reconstruct $X_i$ and therefore maintains a distribution over $X_i$. At the "input side", the value of $Xo_i$ is known, and at the "output side", the likelihood of $\hat{X}i$ under the output distribution of the model is evaluated. Typically p(z|x) is referred to as posterior, and q(z|x) as approximate posterior. p(z) and q(z) are referred to as priors.

For instance, this may be done by minimizing the Kullback-Leibler (KL) divergence between $q_ø(Z_i|X_i)$ and $p_θ(X_i|Z_i)$. The minimization may be performed using an optimization function such as an ELBO (evidence lower bound) function, which uses cost function minimization based on gradient descent. An ELBO function may be referred to herein by way of example, but this is not limiting and other metrics and functions are also known in the art for tuning the encoder and decoder networks of a VAE.

The requirement to learn to encode to Z and back again amounts to a constraint placed on the overall neural network 208 of the VAE formed from the constituent neural networks of the encoder and decoder 208q, 208p. This is the general principle of an autoencoder. The purpose of forcing the autoencoder to learn to encode and then decode a compressed form of the data, is that this can achieve one or more advantages in the learning compared to a generic neural network; such as learning to ignore noise in the input data, making better generalizations, or because when far away from a solution the compressed form gives better gradient information about how to quickly converge to a solution. In a variational autoencoder, the latent vector Z is subject to an additional constraint that it follows a predetermined form of probabilistic distribution such as a multidimensional Gaussian distribution or gamma distribution.

Figure 4B:
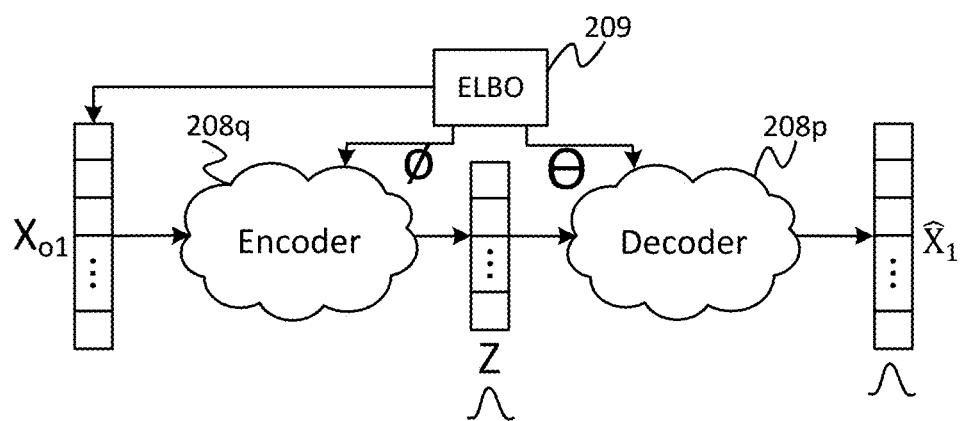

FIG. 4B shows a more abstracted representation of a VAE such as shown in FIG. 4A.

Figure 4C:
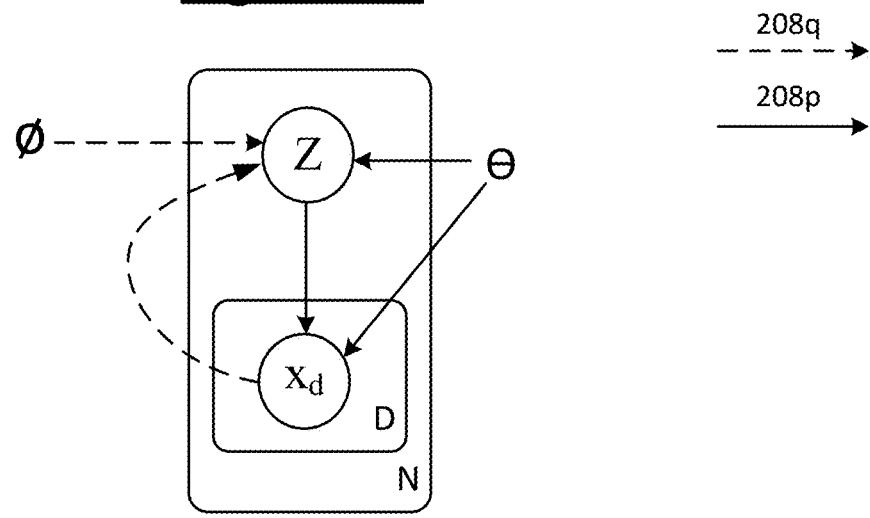

FIG. 4C shows an even higher level representation of a VAE such as that shown in FIGS. 4A and 4B. In FIG. 4C the solid lines represent a generative network of the decoder 208q, and the dashed lines represents an inference network of the encoder 208p. In this form of diagram, a vector shown in a circle represents a vector of distributions. So here, each element of the feature vector X (=x1 ... xd) is modelled as a distribution, e.g. as discussed in relation to FIG. 1C. Similarly each element of the latent vector Z is modelled as a distribution. On the other hand, a vector shown without a circle represents a fixed point. So in the illustrated example, the weights Θ of the generative network are modelled as simple values, not distributions (though that is a possibility as well). The rounded rectangle labelled N represents the "plate", meaning the vectors within the plate are iterated over a number N of learning steps (one for each data point). In other words i=0, ..., N−1. A vector outside the plate is global, i.e. it does not scale with the number of data points i (nor the number of features d in the feature vector). The rounded rectangle labelled D represents that the feature vector X comprises multiple elements x1 . . . xd.

There are a number of ways that a VAE 208 can be used for a practical purpose. One use is, once the VAE has been trained, to generate a new, unobserved instance of the feature vector $\hat{X}$ by inputting a random or unobserved value of the latent vector Z into the decoder 208p. For example if the feature space of X represents the pixels of an image, and the VAE has been trained to encode and decode human faces, then by inputting a random value of Z into the decoder 208p it is possible to generate a new face that did not belong to any of the sampled subjects during training. E.g. this could be used to generate a fictional character for a movie or video game.

Another use is to impute missing values. In this case, once the VAE has been trained, another instance of an input vector Xo may be input to the encoder 208q with missing values. I.e. no observed value of one or more (but not all) of the elements of the feature vector Xo. The values of these elements (representing the unobserved features) may be set to zero, or 50%, or some other predetermined value representing "no observation." The corresponding element(s) in the decoded version of the feature vector $\hat{X}$ can then be read out from the decoder 208p in order to impute the missing value(s). The VAE may also be trained using some data points that have missing values of some features.

Another possible use of a VAE is to predict a classification, similarly to the idea described in relation to FIG. 1A. In this case, illustrated in FIG. 4D, a further decoder 208pY is arranged to decode the latent vector Z into a classification Y, which could be a single element or a vector comprising multiple elements (e.g. a one-hot vector). During training, each input data point (each observation of Xo) is labelled with an observed value of the classification Y, and the further decoder 208pY is thus trained to decode the latent vector Z into the classification Y. After training, this can then be used to input an unlabelled feature vector Xo and have the decoder 208pY generate a prediction of the classification Y for the observed feature vector Xo.

According to some embodiments, the primary model 901 may comprise a sequential model. That is, the auxiliary model 700 may predict new model parameters for use by sequential model in predicting values of the new feature. A sequential model will now be described.

An improved method of forming a machine learning model 208', in accordance with embodiments disclosed herein, is now described with reference to FIGS. 5A-5E. Particularly, the method disclosed herein is particularly suited to automated sequential decision making when only a group of features is available for observation. This machine learning (ML) model 208' can be used in place of a standard VAE in the apparatus 200 of FIG. 2, for example, in order to make predictions, perform imputations, and make decisions. The mode 208' will be referred to below as a "sequential model" 208'.

A sequential model 208' comprises a sequence (i.e. series) of stages. The sequence comprises an initial stage followed by one or more successive (i.e. further) stages. In general, the initial stage receives an initial input (i.e. one or more observed features, discussed below) and makes a decision (i.e. performs a task, also discussed below). The decision is made at least in part based on the initial input, and is made in order to drive towards a desired outcome. Each of the successive stages is dependent on the state of the previous stage (e.g. a second stage is dependent on the state of the first stage). In some examples, the decision made at a given stage influences the latent state representation at the stage (e.g. an observation made at one stage affects that stage's latent space representation). In some examples, the decision made at a given stage influences the latent space representation of the succeeding stage (e.g. a task performed at a previous stage affects the present stage). Thus the sequential model is sequential in that the model is arranged to make a sequence of decisions, where the decisions made are influenced by the previously made decisions and the state of the previous stages.

In general, the sequential model may receive, as inputs, a set of features, e.g. real-world features, related to a target such as, for example a living being (e.g. a human or a different animal), or a machine (e.g. a mechanical apparatus, a computer system, etc.). At any given stage, the sequential model may receive a group of the available features. For instance, only some but not other features may be input to the model (i.e. observed). As an example, a patient's temperature may be supplied as an input. As another example, the velocity of a machine (e.g. a car) may be supplied as an input. It is also not excluded that in some examples the full set of features may be supplied as inputs. In some examples, the observed features may comprise sensor measurements that have been measured by respective sensors, and/or the observed features may comprise inputs by a human, e.g. answers to a health questionnaire.

In general, the sequential model may also output a set of actions to take in relation to the target. For instance, an action may include interacting with the target in one way or another. In some examples, performing an action may include observing one or more of the features. In other examples, performing an action may include implementing a task that affects the target, e.g. a task that physically affects the target. If the target is a living being, the task may mentally or physiologically affect the target. As a particular example, performing a task on a human may include performing a medical surgery on the human or supplying a medicament to the human. Note that outputting an action may comprise outputting a request or suggestion to perform the action, or in some examples, actually performing the action. For instance, the sequential model may be used to control a connected device that is configured to observe a measurement or perform a task, e.g. to supply a drug via an intravenous injection.

Each stage comprises a respective instance of a VAE. The VAE of each stage comprises an encoder network configured to take, as an input, one or more observed features and encode from those observed features to a latent space representation at that stage. I.e. at a first stage, a first group of one or more observed features is used by the encoder network to infer a latent space representation at that stage. The VAE of each stage also comprises a decoder network configured to decode from the latent space representation to a decoded version of the set of features (i.e. the set of observed and unobserved features). I.e. a first latent space representation at the first stage is used to generate (i.e. predict) the set of features as a whole.

Some or all of the stages also comprises a respective instance of a second decoder network. That is, those stages comprise at least two decoder networks, one that forms part of the VAE of that stage and an additional decoder network. The second decoder network of a given stage is configured to use the latent space representation at that stage to predict (i.e. generate otherwise select) one or more actions to take.

Some or all of the successive stages in the sequence (e.g. all but the initial stage) further comprises a respective instance of a second encoder network. That is, those successive stage comprise at least two encoder networks, one that forms part of the VAE of that stage and an additional decoder network. The second encoder network of a given stage is configured to encode from the predicted action(s) of the previous stage to a latent space representation of that stage. I.e. the latent space representation of a present stage is at least partly inferred based on the action(s) made by the preceding stage. In some embodiments, only predicted tasks are encoded into the latent space representation. In that case, the predicted features to observe at a present stage are used to infer the latent space representation at that present stage, i.e. the same present stage. In other words, the newly observed features are fed back into the derivation of the latent space representation at that stage.

Each successive stage in the sequence comprises a sequential network configured to transform from the latent space representation of the previous stage to the latent space representation of the present stage. That is, the latent space representation of a given successive stage is based on the latent space representation of the preceding stage.

Therefore the latent space of a given successive stage depends on (i.e. is inferred using) at least the latent space of a previous stage, and in some examples, the actions taken at the previous stage, and hence the sequential model evolves across the sequence of stages.

Note that the model may comprise more stages than those described herein. That is, the model comprises at least the described stages, the model is not limited only to these stages.

Figure 5A:
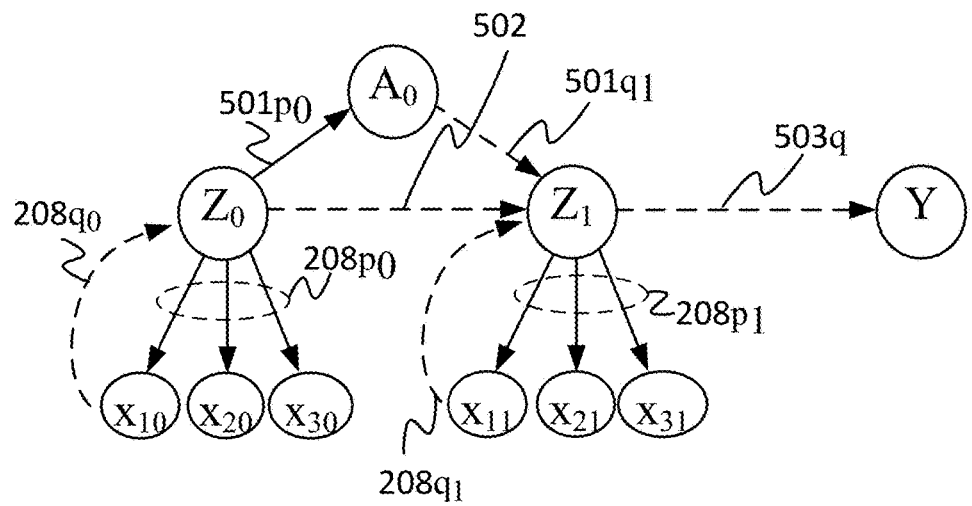
FIGS. 5A to 6 are schematic illustrations of examples of a partial VAEs.

Referring first to FIG. 5A, at each stage t (t=0 . . . T) of the sequential model 208', a respective VAE is trained for each of a set of observed features, e.g. $X_{10}$ and $X_{20}$ at stage t=0. In FIG. 5A, for a feature $X_{it}$, i indicates the feature itself, whilst t indicates the stage at which the feature is observed or generated, as the case may be. Only three features are shown here by way of illustration, but it will be appreciated that other numbers could be used. The observed features together form a respective group of the feature space. That is, each group comprises a different respective one or more of the features of the feature space. I.e. each group is a different one or more of the elements of the observed feature vector $X_{ot}$. In the example of FIG. 5A, the observed feature vector $X_{o0}$ at stage 0 may comprise $X_{10}$ and $X_{20}$. An unobserved feature vector $X_{ut}$ comprises those features that are not observed. In the example of FIG. 5A, the unobserved feature vector $X_{u0}$ at stage 0 may comprise $X_{30}$.

The features may include data whose value takes one of a discrete number of categories. An example of this could be gender, or a response to a question with a discrete number of qualitative answers. In some cases the features may categorical data could be divided into two types: binary categorical and non-binary categorical. E.g. an example of binary data would be answers to a yes/no question, or smoker/non-smoker. An example of non-binary data could be gender, e.g. male, female or other; or town or country of residence, etc. the features may include ordinal data, or continual data. An example of ordinal data would be age measured in completed years, or a response to a question giving a ranking on a scale of 1 to 10, or one or five stars, or such like. An example of continuous data would be weight or height. It will be appreciated that these different types of data have very different statistical properties.

Each feature $X_{it}$ is a single respective feature. E.g. one feature $X_{1t}$ could be gender, another feature $X_{2t}$ could be age, whilst another feature $X_{3t}$ could be weight (such as in an example for predicting or imputing a medical condition of a user).

The VAE of each stage t comprises a respective first encoder 208$q_t$ (t=0 . . . T) arranged to encode the respective observed feature $X_{ot}$ into a respective latent representation (i.e. latent space) $Z_t$ at that stage. The VAE of each stage t also comprises a respective first decoder 208$p_t$ (t=0 . . . T) arranged to decode the respective latent representation $Z_t$ back into the respective dimension(s) of the feature space of the respective group of features, i.e. to generate a decoded version $\hat{X}_t$ of the respective observed feature group $X_{ot}$ and the unobserved feature group $X_{ut}$. For instance, the first encoder 208$q_0$ at stage 0 encodes from $X_{o0}$ (e.g. $X_{10}$ and $X_{20}$) to $Z_0$, and the first decoder 208$q_0$ at stage 0 decodes from $Z_0$ to $\hat{X}_0$ (e.g. decoded versions of $X_{10}$, $X_{20}$ and $X_{30}$).

In some embodiments each of the latent representations $Z_t$ is one-dimensional, i.e. consists of only a single latent variable (element). Note however this does not imply the latent variable $Z_t$ is a modelled only as simple, fixed scalar value. Rather, as the auto-encoder is a variational auto-encoder, then for each latent variable $Z_t$ the encoder learns a statistical or probabilistic distribution, and the value input to the decoder is a random sample from the distribution. This means that for each individual element of latent space, the encoder learns one or more parameters of the respective distribution, e.g. a measure of centre point and spread of the distribution. For instance each latent variable $Z_t$ (a single dimension) may be modelled in the encoder by a respective mean value and standard deviation or variance.

However preferably each of the latent space representations $Z_t$ is multi-dimensional, in which case each dimension is modelled by one or more parameters of a respective distribution.

As shown in FIG. 5A, at a first successive stage t=1, the respective VAE of that stage comprises a respective first encoder 208$p_1$ and a respective first encoder 208$q_1$. The first encoder 208$q_1$ at stage 1 may encode from $X_{o1}$ (e.g. $X_{21}$) to $Z_1$, and the first decoder 208$q_0$ at stage 1 decodes from $Z_1$ to $\hat{X}_1$ (e.g. decoded versions of $X_{11}$, $X_{21}$ and $X_{31}$). Note that the observed feature vector $X_{o1}$ may depend, at least in part, on the action output at stage 0, as described in more detail below.

FIG. 5A also shows at least some of the stages comprising a respective second decoder network 501$p_t$. In the example of FIG. 5A only the initial stage 0 comprises a second decoder network 501$p_0$, whereas the successive stage (stage 1) does not comprise a second decoder network. However it is not excluded that some or all of the successive stages may comprise a respective second decoder, as is the case in FIG. 5B. It is also not essential that the initial stage 0 comprises a respective second decoder. The second decoder network 501$p_t$ of a given stage t is configured to predict one or more actions $A_t$ based on the latent space representation $Z_t$ at that stage t. For instance, at stage 0, the second decoder network 501$p_0$ decodes from the latent space representation $Z_0$ to predict action(s) $A_0$. Any given second decoder network 501$p_t$ may predict a single action $A_t$ or multiple actions $A_t$.

As mentioned above, the sequence of stages comprises one or more successive stages, and one some or all of those successive stages may comprise a respective second encoder network 501$q_t$. The second encoder network 501$q_t$ is configured to encode from the predicted actions $A_{t-1}$ of the previous stage to the latent space representation $Z_t$ of that successive stage, i.e. the "present stage". That is, a second encoder network 501$q_t$ at stage t encodes from the action(s) predicted at stage t-1 to the latent space representation $Z_t$ at stage t. In the example of FIG. 5A, stage 1 comprises a second encoder network $501q_0$ that encodes actions(s) $A_0$ to the latent space representation $Z_1$. Each successive stage in FIG. 5A is shown as comprising a respective second encoder network $501q_t$, but it will be appreciated that this is just one of several possible implementations.

Note that when the action is to acquire a new feature, this new feature may be added to $X_{ot}$, and not $X_{ot+1}$. This means acquiring a new feature does not cause a transition of the latent state $Z_t$ to $Z_{t+1}$, e.g. measuring the body temperature X of a patient does not make a change to the patient's health condition Z. On the other hand, if a task is performed (e.g. give a treatment), this will change the internal state and cause the transition from $Z_t$ to $Z_{t+1}$. Therefore in this implementation, it is only the predicted tasks of a previous stage, rather than the predicted actions as a whole, that are encoded into the latent space representation of the following stage.

Each successive stage further comprises a sequential network 502 configured to transform the latent space representation $Z_t$ of a previous stage into a latent space representation $Z_t$ of a present stage. That is, stage t comprises a sequential network 502 that transforms (i.e. maps) from the latent space representation $Z_{t-1}$ at stage t−1 to the latent space representation $Z_t$ at stage t. In the example of FIG. 5A, stage 1 comprises a sequential network 502 that transforms from latent space representation $Z_0$ to latent space representation $Z_1$. In this example, $Z_1$ is dependent on both $Z_0$ and $A_0$. The sequential network 502 may also be referred to as a linking network, or a latent space linking network. A linking network links (i.e. maps) one representation to another. In this case, a preceding latent space representation is linked to a succeeding latent space representation. In practice, any suitable neural network may be used as the sequential network 502.

Also shown in FIG. 5A, a final stage (i.e. a stage different from the initial and successive stages) comprises a third encoder network $503q$. In some examples, as in FIG. 5A, only one third encoder network $503q$ is present, i.e. at the final stage. In this example, the third encoder network encodes from the latent space representation of a final stage of the sequential model to a representation of the outcome of the mode. In other examples, one, some or all of the stages of the model may also comprise a third encoder network $503q_t$. In the examples where a given stage comprises a third encoder network $503q_t$, the third encoder network $503q_t$ is arranged to encode from the latent space latent space representation $Z_t$ of that stage to a representation of the present status $Y_t$ of the target. The third encoder network $503q$ that encodes from the final latent space representation ($Z_1$ in FIG. 5A) encodes to a representation of the outcome Y of the model, i.e. the final status of the target. In the context of a medical setting, the present status $Y_t$ of the target at a given stage may be the health status of the target at that stage. The outcome Y of the sequential model, i.e. the final status of the target, may be the final health status of the target (e.g. discharged from hospital or deceased). In some embodiments, the present status (e.g. the outcome) at stage t may be output to a user via interface 204.

Note that "final stage" does not necessarily mean that there no further stages in the model. Rather, final stage is used to refer to the final stage in the described sequence of stages. Further stages in the model as a whole are not excluded. Similarly, and for the avoidance of doubt, the "initial stage" of the sequence need not necessarily be the foremost stage of the model.

FIG. 5A can be summarised in the following way. At an initial stage 0, one or more features $X_{oO}$ are observed and a respective first encoder network $208q_0$ of a VAE encodes from the observed features $X_{oO}$ to a latent space representation $Z_0$. A respective first decoder network $208p_0$ of the VAE decodes from the latent space representation $Z_0$ to the feature space $\hat{X}_0$, i.e. the observed features $X_{oO}$ and the unobserved features $X_{uO}$. A respective second decoder network $501p_0$ decodes from the latent space representation $Z_0$ to predict one or more actions $A_0$. At a first successive stage 1, one or more features $X_{o1}$ may be observed and/or a task may be performed, depending on the action(s) $A_0$ predicted at stage 0. The VAE at stage 1 functions in a similar way to the VAE at stage 0. Furthermore, a respective second encoder network $501q_1$ encodes from the action(s) to the present latent space representation $Z_1$, and similarly the sequential network 502 transforms from the preceding latent space representation $Z_0$ from stage 0 to the present latent space representation $Z_1$. A third encoder network encodes from the latent space representation $Z_1$ at stage 1 to a final outcome Y of the model 208'.

Figure 5B:
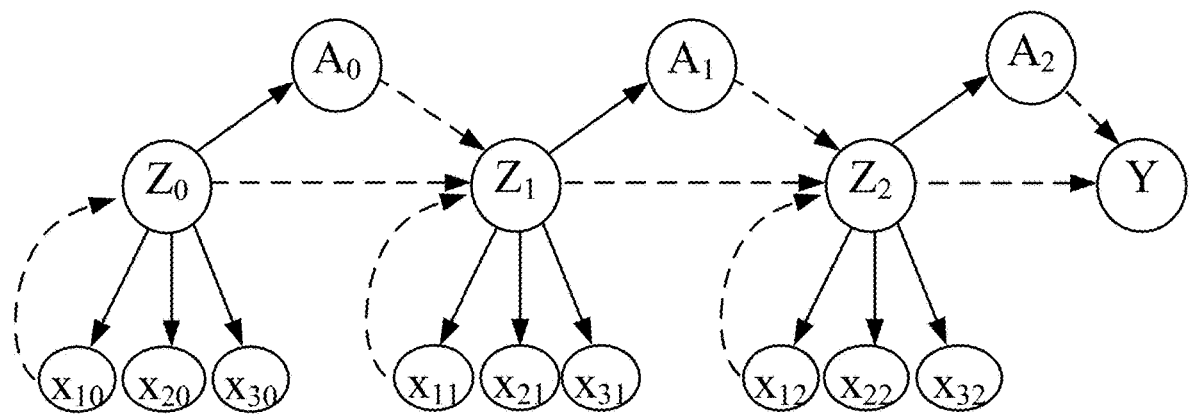

FIG. 5B illustrates another embodiment of the sequential model 208'. The example of FIG. 5B is similar to that of FIG. 5A with the addition of an extra successive stage and several additional networks. That is, the model 208' of FIG. 5B comprises three stages (t=1, 2, 3). Each stage comprises a respective VAE as described above. Each stage also comprises a respective second decoder network $501p_t$ and a respective encoder network $501q_t$. Each stage also comprises a respective sequential network 502. Again, the model comprises a third encoder network 503 arranged to encode from the final latent space representation $Z_2$ to a final outcome Y.

Figure 5C:
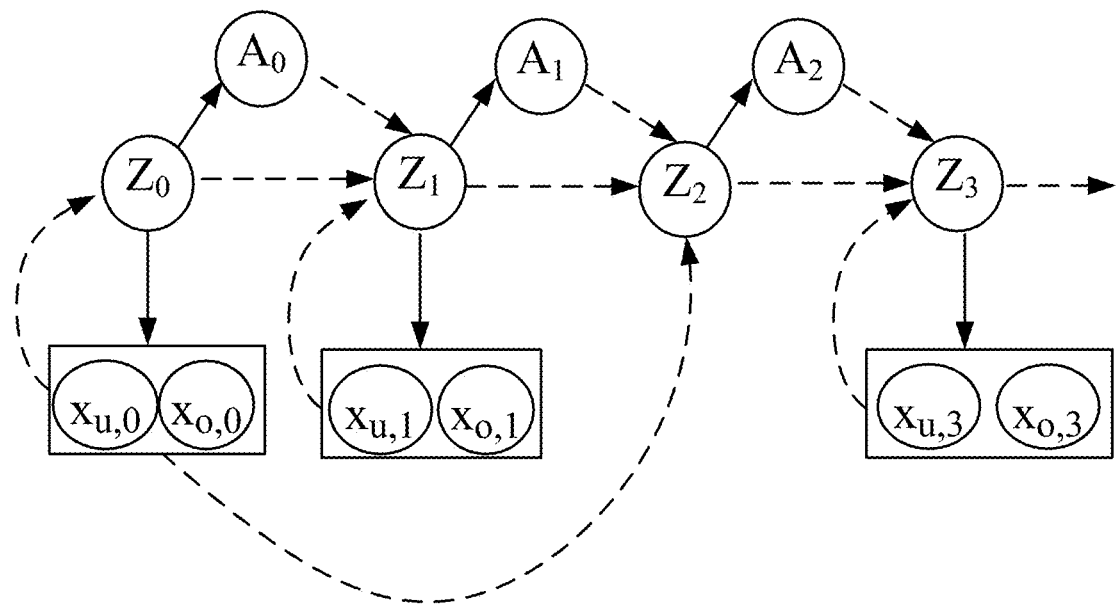

FIG. 5C illustrates another embodiment of the model 208'. In this example, the decoded features $\hat{X}_t$ of one stage are used by the first encoder $208q_t$ of a different stage to encode the respective latent space representation $Z_t$ of that different stage. In FIG. 5C, the decoded features $\hat{X}_t$ of an earlier stage are used by the VAE of a later stage to encode the present latent space representation $Z_t$. Specifically, the decoded features $\hat{X}_0$ at stage 0 are used by the VAE of stage 2 to infer latent space representation $Z_2$.

Figure 5D:
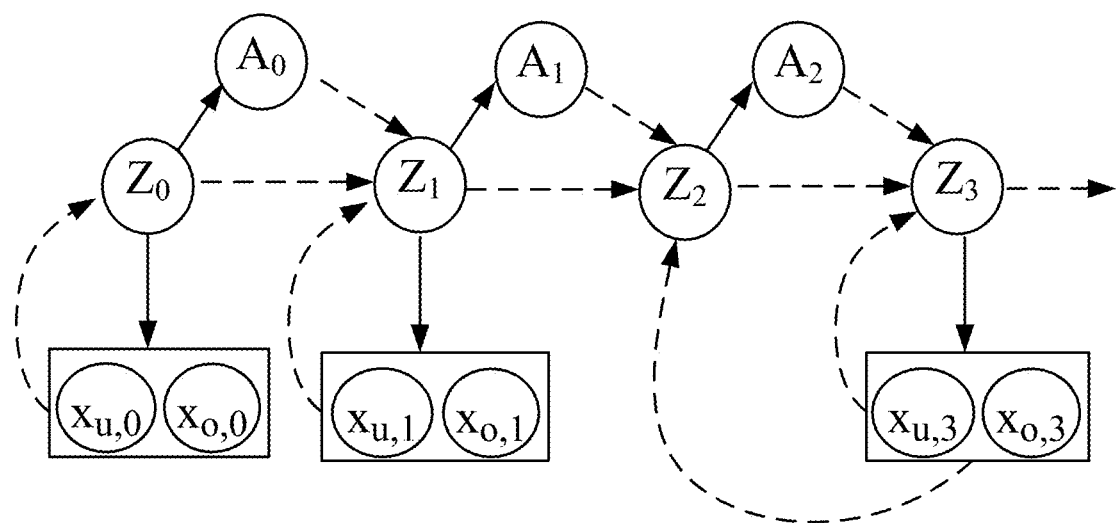

FIG. 5D is similar to that of FIG. 5C with the exception that the decoded features $\hat{X}_t$ of a later stage are used by the VAE of an earlier stage to encode the present latent space representation $Z_t$.

Figure 5E:
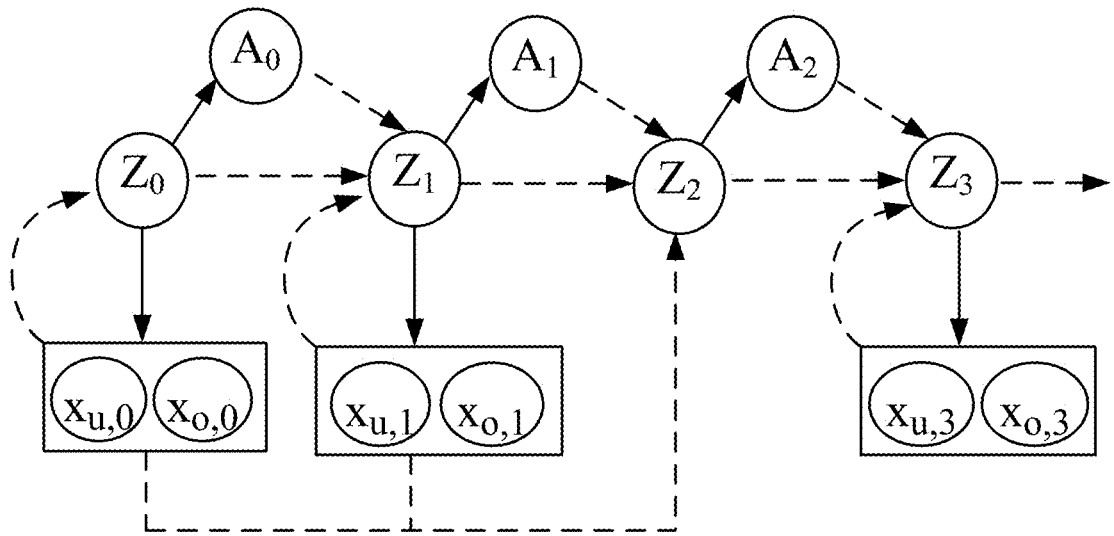

FIG. 5E shows that the decoded features $\hat{X}_t$ of multiple stages (e.g. multiple earlier stage or multiple later stages) may be used by the VAE of a particular stage. As shown in FIG. 5E, the decoded features $\hat{X}_0$ of stage 0 and the decoded features $\hat{X}_1$ of stage 1 are used by the VAE of stage 2 to infer the latent space representation $Z_2$. In some examples, both the decoded features $\hat{X}_t$ of one or more earlier stages and the decoded features $\hat{X}_t$ of one or more later stages may be used by the VAE of a particular stage.

These embodiments allow information from one or more previous stages and/or one or more future stages to be used at a different stage of the sequential model 208' to improve the inference of the later space representation $Z_t$. In other words, information from the past may be used to be more accurately determine the state of the model at a later point in time. Similarly, information from the future may be used to more accurately determine the state of the model at an earlier point in time. As shown in FIG. 5E, all of the decoded information up until a certain stage (e.g. a certain point in time) may be "re-used" to improve the belief about the system at that stage.

The sequential model 208' is first operated in a training mode, whereby the respective networks of the model 208' are trained (i.e. have their weights tuned) by a learning function 209 (e.g. an ELBO function). The learning function trains the model 208' to learn which actions to take at each stage of the model 208' in order to achieve a desired outcome, or at least drive toward a desired outcome. For instance, the model may learn which actions to take in order to improve a patient's health. The learning function comprise a reward function that is a function of the predicted outcome, e.g. a respective (positive) effect of a particular action on the predicted outcome, i.e. a reward for taking that particular action.

As mentioned above, an action may comprise acquiring more information (i.e. features) about the target or performing a task on the target. The learning function therefore learns which features to acquire and/or tasks to perform at least based on the reward associated with each feature or task. For instance, the learning function may learn to predict (i.e. choose) the action that is associated with the greatest reward. This may involve acquiring a feature that would reveal the most valuable information about the target, or performing a task that would have the most positive effect on the present status of the target, i.e. make the most progress towards the desired outcome of the model 208'.

If the chosen action is to acquire a new feature, the sequential model 208' outputs a signal or message via the interface 204 requesting that a value of this feature is collected and returned to the algorithm 206 (being returned via the interface 204). The request may be output to a human user, who manually collects the required value and inputs it back through the interface 204 (in this case a user interface). Alternatively the request could be output to an automated process that automatically collects the requested feature and returns it via the interface. The newly collected feature may be collected as a stand-alone feature value (i.e. the collected feature is the only evaluated feature in the newly collected data point). Alternatively it could be collected along with one or more other feature values (i.e. the newly collected data point comprises a values of a plurality of features of the feature vector including the requested feature). Either way, the value of the newly collected feature(s) is/are then included amongst the observed data points in the observed data set.

Similarly, if the chosen action is perform a task, the sequential model 208' outputs a signal or message via the interface 204 requesting that a task is performed. The request may be output to a human user, who manually performs the task. Alternatively the request could be output to an automated process that automatically performs the task. An indication that the task has been performed may be returned to the algorithm 206 (being returned via the interface 204). Alternatively, the model 208' may be programmed to assume that the predicted tasks are performed.

Preferably, the learning function comprises a penalty function that is a function of the cost associated with performing each action. That is, the acquisition (i.e. observation) of a new feature may be associated with a respective cost. Similarly, the performance of a task may be associated with a respective cost. It will be appreciated that some observations may be more costly than others. Similarly, some tasks may be more costly than others. For instance, the task of performing surgery on a patient may be more costly than supplying a patient with an oxygen supply, both of which may be more costly than measuring the patient's temperate or blood pressure. The cost of each action may be based on the same measurement, e.g. a risk to the patient's health, or the cost of different actions may be based on different measurements, e.g. risk, financial cost, time taken to perform the action, etc. The cost of each action may be based on several measurements.

The learning function may in general take the following form:

$$R = f(Y) - g(Q)$$

Where R is the learning function, $f(Y)$ is the reward function as a function of the effect of an action on the predicted outcome Y, and $g(Q)$ is the penalty function as a function of the cost of the action Q.

In some embodiments, the reward and/or cost of an action may be time-dependent. That is, the reward and/or cost of an action may be a function of the time at which the action is performed, or more generally, the stage of the sequential model at which the action is predicted. For instance, observing a feature may reveal more information if observed at an earlier stage compared to a later stage, or if the same feature has not been revealed for a prolonged period of time. Similarly, a task (e.g. medical procedure) may be more costly if performed on a patient who has been ill for a while compared with a patient who has been ill for a shorter period of time. The time-dependency of the reward and/or cost of an action may be preconfigured, e.g. by a health practitioner, or the learning function may learn the time-dependencies. That is, the learning function may learn that that certain actions have a greater reward and/or cost if performed at one stage compared to another stage.

The sequential model 208' may be trained using the data of many different training targets. The model may then be used to determine one or more actions to take in relation to a new target in order to achieve a desired outcome for the new target. This is illustrated schematically in FIG. 6.

Figure 6:
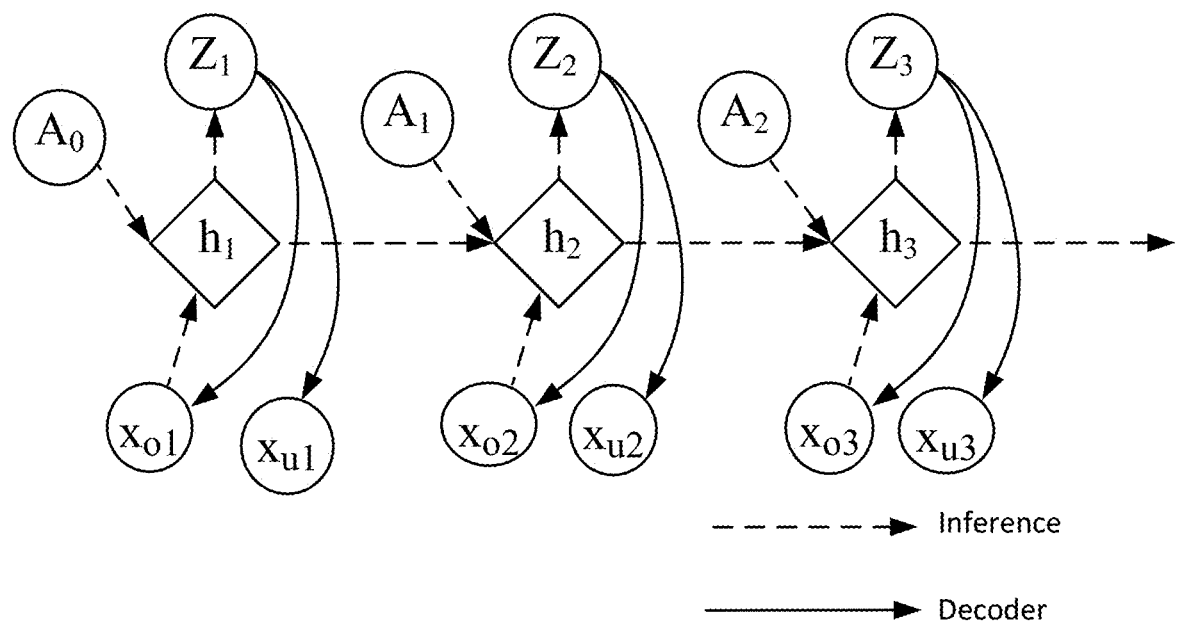

FIG. 6 illustrates another schematic representation of the sequential model 208'. In this Figure, the model is expanded to show hidden states of the model. As shown, at each stage the action(s) and partial observation(s) are used to infer a hidden state in a deterministic manner, which is then used to infer a latent space representation in a probabilistic manner. That is, $h_1$ is deterministically derived from $A_0$ and $X_{o0}$, and then $h_1$ is used to generate a probabilistic representation of $Z_1$. The nature of the hidden states is described in more detail below.

The trained sequential model 208' may be employed to predict actions to take to improve the condition of a user, such as to treat a disease or other health condition. For example, once trained, the model may receive the answers to questions presented to a user about their health status to provide data to the model. A user interface may be provided to enable questions to be output to a user and to receive responses from a user for example through a voice or other interface means. In some example, the user interface may comprise a chatbot. In other examples, the user interface may comprise a graphical user interface (GUI) such as a point and click user interface or a touch screen user interface. The trained algorithm may be configured to use the user responses, which provide his or her health data, to predict actions to take to improve the user's condition. In some embodiments, the model can be used to recommend actions to take to improve the user's health (e.g. an action may be to provide the user with a certain medicine). A user's condition may be monitored by asking questions which are repeated instances of the same question (asking the same thing, i.e. the same question content), and/or different questions (asking different things, i.e. different question content). The questions may relate to a condition of the user in order to monitor that condition. For example, the condition may be a health condition such as asthma, depression, fitness etc. User data may also be provided from sensor devices, e.g. a wearable or portable sensor device worn or carried about the user's person. For example, such a device could take the form of an inhaler or spirometer with embedded communication interface for connecting to a controller and supplying data to the controller. Data from the sensor may be input to the model and form part of the patient data for using the model to make predictions.

Contextual data may also be provided for training and using the algorithm. Such data could comprise a user's location. A user's location could be monitored by a portable or wearable device disposed about the user's person (plus any one or more of a variety of known localisation techniques such as triangulation, trilateration, multiliteration or finger printing relative to a network to known nodes such WLAN access points, cellular base stations, satellites or anchor nodes of a dedicated positioning network such an indoor location network). Other contextual information such as sleep quality may be inferred from personal device data, for example by using a wearable sleep monitor. In further alternative or additional examples, sensor data from e.g. a camera, localisation system, motion sensor and/or heart rate monitor can be used as metadata. In some examples, the contextual data may be used as training data, or as feature-specific metadata input to the auxiliary model. It is also not excluded that some or all the example contextual data may in fact be features of the model, e.g. user data.

The model 208' may be trained to treat a particular disease or achieve a particular health condition. For example, the model may be used to treat a certain type of cancer or diabetes based on training data of previous patients. Once a model has been trained, it can be utilised to provide a treatment plan for that particular disease when patient data is provided from a new patient.

Another example of use of the model 208' is to take actions in relation to a machine, such as in the field of oil drilling. The data supplied may relate to geological conditions. Different sensors may be utilised on a tool at a particular geographic location. The sensors could comprise for example radar, lidar and location sensors. Other sensors such as the thermometers or vibration sensors may also be utilised. Data from the sensors may be in different data categories and therefore constitute mixed data. Once the model has been effectively trained on this mixed data, it may be applied in an unknown context by taking sensor readings from equivalent sensors in that unknown context and used to make drilling-related decisions, e.g. to change parameters of the drill such as drilling power, depth, etc.

A possible further application is in the field of self-driving cars, where decisions are made during driving. In that case, data may be generated from sensors such as radar sensors, lidar sensors and location sensors on a car and used as a feature set to train the model to take certain actions based on the condition that the car may be in. Once a model has been trained, a corresponding mixed data set may be provided to the model to predict certain actions, e.g. increase/decrease speed, change heading, brake, etc.

A further possible application of the trained model 208' is in machine diagnosis and management in an industrial context. For example, readings from different machine sensors including without limitation, temperature sensors, vibration sensors, accelerometers, fluid pressure sensors may be used to train the model for preventative maintenance. Once a model has been trained, it can be utilised to predict actions to take to maintain the machine in a desired state, e.g. to ensure the machine is operable for a desired length of time. In this context, an action may be to decrease a load on a machine, or replace a component of the machine, etc.

Conclusion

It will be appreciated that the above embodiments have been described by way of example only.

More generally, according to one aspect disclosed herein, there is provided a computer-implemented method of training an auxiliary machine learning model to predict a set of new parameters of a primary machine learning model, wherein the primary model is configured to transform from an observed subset of a set of real-world features to a predicted version of the set of real-world features, and wherein the auxiliary model comprises:

a first neural network configured to transform from a set of first input vectors to a single context vector, wherein each input vector is associated with a respective data point of the primary model and comprises a respective representation vector comprising an internal representation of the observed subset of real-world features of that data point and a respective value of the new feature for that respective data point, and wherein the context vector is a representation of values of the new feature in context of the primary model; and a second neural network configured to predict a set of new parameters of the primary model based on at least the context vector, wherein the primary model is configured to use the set of new parameters to transform from at least the observed version of the set of real-world features to a predicted version of the new real-world feature.

In embodiments, the primary model may comprise an existing set of parameters prior to said training of the auxiliary model, and wherein the existing set of parameters are frozen during training of the auxiliary model.

In embodiments, for at least some of the first input vectors, the respective value of the new feature for the respective data point may be a value representing a lack of observation of the new feature.

In embodiments, the auxiliary model may comprise a third neural network configured to transform from a second input vector comprising a set of metadata values associated with the new feature to a metadata vector comprising a representation of the set of metadata values, and wherein the second network is configured to predict the set of new parameters based on the metadata vector.

In embodiments, the first neural network may comprise a first sub-network and a second sub-network, and wherein the first neural network is configured to transform from the set of first input vectors to the context vector by: the first sub-network transforming each first input vector to a respective first intermediate vector; an aggregation function aggregating each of the intermediate vectors to generate a fixed-length vector; and the second sub-network generating the context vector as a representation of the fixed-length vector.

In embodiments, the auxiliary model may be connected to the primary model, and wherein the auxiliary model is configured to receive the respective representation vectors directly from the primary model.

In embodiments, the auxiliary model may be connected to the primary model, and wherein the auxiliary model is configured to output the predicted set of new parameters directly to the primary model.

According to another aspect disclosed herein, there is provided a computer-implemented method of operating a primary machine learning model, wherein the primary model is configured to use the predicted set of new parameters generated by the auxiliary model of claim 1 to transform from at least an observed version of a set of real-world features to a predicted version of a new real-world feature.

In embodiments, the primary model may comprise a variational auto-encoder. For example, the primary model may comprise a partial variational auto-encoder.

In embodiments, each data point may be associated with a respective living being, wherein the set of real-world features comprise characteristics of a respective living being.

The predicted version of the real-world features may be used to diagnose and/or improve a characteristic (e.g. health condition) of a target living being.

In embodiments, one or more of the characteristics of the respective living being may be based on sensor measurements of the respective living being and/or survey data supplied by or on behalf of the respective living being.

In some examples, the living being may be a human.

In embodiments, each data point may be associated with a respective machine, wherein the set of real-world features comprise characteristics of the machine and/or an object that the machine is configured to interact with.

The predicted version of the real-world features may be used to diagnose and/or improve a characteristic (e.g. operational performance) of the machine.

In embodiments, training the auxiliary model may comprise: training the auxiliary model using training data comprising only a subset of the set of real-world features; randomly sampling data points having respective observed values for the subset of real-world features, wherein the respective observed values for the remaining data points are hidden from the auxiliary model; and training the auxiliary model to use the predicted set of new parameters to predict the respective observed values for the remaining data points.

In other words, only some of the features may be available to the auxiliary model during training. Out of those features, the model samples from some data points whilst other data points are hidden. I.e. the model has access to some values of the feature but not others. The new predicted parameters are then used to predict the hidden values. The model is trained, e.g. using a loss function, to update the predicted parameters so that the predicted values match the actual values.

Or, in yet other words, the training method may comprise holding out a set of features to use as training data for the auxiliary model, then sampling features at random with some random number of associated observations and asking the model to use the predicted parameters to predict the remaining values for this feature.

According to another aspect disclosed herein, there is provided a computer program embodied on computer-readable storage and configured so as when run on one or more processing units to perform any of the described embodiments.

According to another aspect disclosed herein, there is provided a computer system comprising: memory comprising one or more memory units; and processing apparatus comprising one or more processing units, wherein the memory stores code being configured so as when run on one or more processing units to perform the method of any of the described embodiments.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method for training an auxiliary model to predict a new parameter for a primary model, the method comprising:
   collecting a new feature data;
   encoding, into a representation vector, an internal representation of an observed real-world feature associated with a respective data point of the primary model, wherein the primary model is a machine learning model;
   supplying, by the primary model, the representation vector to the auxiliary model, wherein the auxiliary model is a machine learning model;
   creating a first input vector comprising the collected new feature data and the representation vector, wherein the first input vector comprises a value of the new feature data for the respective data point;
   training the auxiliary model in a first stage using the first input vector to produce a single context vector, wherein the context vector is a representation of the value of the new feature data in context of the primary model;
   training the auxiliary model in a second stage using the single context vector to predict the new parameter for the primary model; and
   supplying, by the auxiliary model, the new parameter to the primary model.

2. The method of claim 1, wherein the primary model comprises an existing parameter prior to said training of the auxiliary model, and wherein the existing parameter is frozen during training of the auxiliary model.

3. The method of claim 1, wherein the value of the new feature data for the respective data point is a value representing a lack of observation of the new feature data.

4. The method of claim 1, wherein the auxiliary model comprises a neural network configured to transform a second input vector comprising a metadata value associated with the new feature data to a metadata vector comprising a representation of the metadata value, and wherein training the auxiliary model in the second stage using the second input vector to predict the new parameter for the primary model is based on the metadata vector.

5. The method of claim 1, wherein the first stage comprises a first sub-network and a second sub-network, and wherein the first stage is configured to produce the context vector by:
   the first sub-network transforming each first input vector to a respective first intermediate vector;
   an aggregation function aggregating each intermediate vector to generate a fixed-length vector; and
   the second sub-network generating the context vector as a representation of the fixed-length vector.

6. The method of claim 1, wherein the auxiliary model is connected to the primary model, and wherein the auxiliary model is configured to receive the respective representation vector directly from the primary model.

7. The method of claim 1, wherein the auxiliary model is connected to the primary model, and wherein the auxiliary model is configured to output the predicted new parameter directly to the primary model.

8. A computer-implemented method of operating a primary machine learning model, wherein the primary machine learning model is configured to use the predicted new parameter generated by the auxiliary model of claim 1 to transform an observed version of a real-world feature to a predicted version of a new real-world feature.

9. The method of claim 1, wherein the primary model comprises a variational auto-encoder.

10. The method of claim 1, wherein each data point is associated with a respective living being, wherein the real-world feature comprises a characteristic of a respective living being.

11. The method of claim 10, wherein the characteristic of the respective living being is based on a sensor measurement of the respective living being and/or survey data supplied by or on behalf of the respective living being.

12. The method of claim 1, wherein each data point is associated with a respective machine, wherein the real-world feature comprises a characteristic of the machine and/or an object that the machine is configured to interact with.

13. The method of claim 1, wherein training the auxiliary model comprises:
training the auxiliary model using training data comprising the real-world feature;
randomly sampling data points having respective observed values for the real-world feature, wherein the respective observed values for the remaining data points are hidden from the auxiliary model; and
training the auxiliary model to use the predicted new parameter to predict the respective observed values for the remaining data points.

14. A computer program embodied on a non-transitory computer-readable storage and configured to perform a method for training an auxiliary machine learning model to predict a set of new parameters of a primary machine learning model when executed by a processing unit, wherein the primary model is configured to transform an observed subset of a set of real-world features to a predicted version of the set of real-world features, and wherein the auxiliary model comprises:
a first neural network configured to transform a set of first input vectors to a single context vector, wherein each input vector is associated with a respective data point of the primary model and comprises a respective representation vector comprising an internal representation of the observed subset of real-world features of that data point and a respective value of a new feature for that respective data point, wherein the internal representation is encoded into the respective representation vector by the primary model and supplied to the first neural network, wherein the first neural network is trained using a first training dataset comprising at least one feature in the respective representation vector, and wherein the context vector is a representation of values of the new feature in context of the primary model; and
a second neural network configured to predict a set of new parameters for the primary model based on the context vector, wherein the second neural network is trained using a second training dataset comprising at least one feature in the respective representation vector not within the first training dataset, and wherein the primary model is configured to use the set of new parameters to transform the observed subset of the set of real-world features to a predicted version of the new feature, and wherein the method for training the auxiliary model comprises:
supplying, by the primary model, a set of representation vectors to the auxiliary model;
training the auxiliary model using training data comprising only a subset of the set of real-world features;
randomly sampling data points having respective observed values for the subset of real-world features, wherein the respective observed values for the remaining data points are hidden from the auxiliary model; and
training the auxiliary model to use the predicted set of new parameters to predict the respective observed values for the remaining data points.

15. A computer system comprising:
a memory comprising a memory unit; and
a processing apparatus comprising a processing unit,
wherein the memory stores code being configured so as when run on the processing unit to perform a method for training an auxiliary machine learning model to predict a new parameter of a primary machine learning model, wherein the primary model is configured to transform an observed real-world feature into a predicted version of the real-world feature, and wherein the auxiliary model comprises:
a first neural network configured to transform a first input vector to a single context vector, wherein each input vector is associated with a respective data point of the primary model and comprises a respective representation vector comprising an internal representation of the observed real-world feature of that data point, and a respective value of a new feature for that respective data point, wherein the internal representation is encoded into the respective representation vector by the primary model and supplied to the first neural network, wherein the first neural network is trained using a first training dataset comprising at least one feature in the respective representation vector, and wherein the context vector is a representation of values of the new feature in context of the primary model; and
a second neural network configured to predict a new parameter for the primary model based on the context vector, wherein the second neural network is trained using a second training dataset comprising at least one feature in the respective representation vector not within the first training dataset, and wherein the primary model is configured to use the new parameter to transform the observed real-world feature into a predicted version of the new feature.

16. The computer system of claim 15, wherein the primary model comprises an existing parameter prior to said training of the auxiliary model, and wherein the existing parameter is frozen during training of the auxiliary model.

17. The computer system of claim 15, wherein the respective data point is associated with a respective living being, wherein the real-world feature comprises a characteristic of a respective living being.

18. The computer system of claim 17, wherein the characteristic of the respective living being is based on a sensor measurement of the respective living being, survey data supplied by or on behalf of the respective living being, or both.

19. The computer system of claim 15, wherein the primary model encodes the internal representation into the respective representation vector using an instance of a variational autoencoder.

20. The computer system of claim 15, wherein the method for training an auxiliary machine learning model to predict a new parameter of a primary machine learning model further comprises:
randomly sampling data points having a respective observed value for a real-world feature, wherein the respective observed values for the remaining data points are hidden from the auxiliary model; and training the auxiliary model to use the predicted new parameter to predict the respective observed value for the remaining data points using training data comprising the real-world feature.

\* \* \* \* \*